US012712902B2

(12) United States Patent
Northway et al.

(10) Patent No.: US 12,712,902 B2
(45) Date of Patent: Aug. 18, 2026

(54) SYSTEMS AND METHODS FOR DETECTING THE ANOMALIES IN A COMMUNICATIONS NETWORK

(71) Applicant: NetScout Systems, Inc., Westford, MA (US)

(72) Inventors: William Northway, Ann Arbor, MI (US); Michael Ratanatharathorn, Dublin, OH (US); Michael Van Der Laar, Ann Arbor, MI (US); Kyle Oswald, Ypsilanti, MI (US)

(73) Assignee: NetScout Systems, Inc., Westford, MA (US)

(*) Notice: Subject to any disclaimer, the term of this patent is extended or adjusted under 35 U.S.C. 154(b) by 23 days.

(21) Appl. No.: 18/898,586

(22) Filed: Sep. 26, 2024

(65) Prior Publication Data

US 2025/0112944 A1 Apr. 3, 2025

Related U.S. Application Data

(60) Provisional application No. 63/587,331, filed on Oct. 2, 2023.

(51) Int. Cl.
*H04L 9/40* (2022.01)
*H04L 41/0686* (2022.01)
(Continued)

(52) U.S. Cl.
CPC ...... *H04L 63/1425* (2013.01); *H04L 41/0686* (2013.01); *H04L 41/0816* (2013.01);
(Continued)

(58) Field of Classification Search
CPC ......... H04L 9/02; H04L 9/40; H04L 63/1408; H04L 63/14; H04L 63/16; H04L 63/1425;
(Continued)

(56) References Cited

U.S. PATENT DOCUMENTS

| | | | | |
|---|---|---|---|---|
| 7,143,153 | B1 * | 11/2006 | Black | H04L 41/0816 709/224 |
| 7,607,170 | B2 * | 10/2009 | Chesla | H04L 63/1408 709/224 |

(Continued)

OTHER PUBLICATIONS

EP Extended Search Report dated Nov. 18, 2024 in European Patent Application No. 24203257.1.

*Primary Examiner* — James N Fiorillo
(74) *Attorney, Agent, or Firm* — Foley & Lardner LLP

(57) ABSTRACT

The present disclosure describes a method for detecting and mitigating network attacks. The method includes collecting network data packets transmitted by a plurality of computing devices across a communications network; presenting a user interface on a user device, the user interface comprising a threshold calculation button and one or more fields each corresponding to a threshold for a different network characteristic of the communications network; receiving a selection of the threshold calculation button from the user device; determining a threshold for each of the one or more fields based on the collected network data packets; responsive to receiving the selection of the threshold calculation button, automatically populating each of the one or more fields with the threshold determined for the field; and detecting an attack on the communications network using a first threshold that was automatically populated into a first field of the one or more fields.

20 Claims, 20 Drawing Sheets

(51) Int. Cl.

| | |
|---|---|
| ***H04L 41/0816*** | (2022.01) |
| ***H04L 41/142*** | (2022.01) |
| ***H04L 41/22*** | (2022.01) |
| ***H04L 43/045*** | (2022.01) |

(52) U.S. Cl.
CPC ............ *H04L 41/142* (2013.01); *H04L 41/22* (2013.01); *H04L 43/045* (2013.01); *H04L 63/1416* (2013.01); *H04L 63/1441* (2013.01)

(58) Field of Classification Search
CPC . H04L 63/1441; H04L 63/1458; H04L 41/14; H04L 41/16; H04L 41/22; H04L 41/142; H04L 41/145; H04L 41/147; H04L 41/0686; H04L 41/0816; H04L 43/00; H04L 43/04; H04L 43/16; H04L 43/45; H04L 43/62; H04L 43/0876; H04L 43/0882; H04L 2463/141; H04L 2463/142; H04L 2463/143
USPC ........................................................... 726/23
See application file for complete search history.

(56) References Cited

U.S. PATENT DOCUMENTS

| | | | | |
|---|---|---|---|---|
| 7,788,718 | B1 * | 8/2010 | Fei | H04L 63/1458 726/25 |
| 9,558,056 | B2 * | 1/2017 | Sasturkar | G06F 16/285 |
| 10,637,885 | B2 * | 4/2020 | Winquist | H04L 63/1458 |
| 11,496,811 | B2 * | 11/2022 | Froehlich | H04N 21/64738 |
| 12,363,536 | B2 * | 7/2025 | Northway | H04L 41/22 |
| 2005/0125195 | A1 * | 6/2005 | Brendel | H04L 63/1425 702/182 |
| 2006/0117386 | A1 * | 6/2006 | Gupta | H04L 63/1408 713/151 |
| 2006/0137009 | A1 * | 6/2006 | Chesla | G06F 21/552 726/22 |
| 2006/0242694 | A1 * | 10/2006 | Gold | H04L 63/1441 726/13 |
| 2018/0152474 | A1 * | 5/2018 | Winquist | H04L 43/04 |
| 2018/0205756 | A1 * | 7/2018 | Northway, Jr. | H04L 63/1416 |
| 2018/0331922 | A1 * | 11/2018 | Dhingra | H04L 43/062 |
| 2020/0169479 | A1 * | 5/2020 | Ireland | H04L 47/6215 |
| 2020/0285737 | A1 * | 9/2020 | Kraus | G06F 21/552 |
| 2021/0112091 | A1 * | 4/2021 | Compton | H04L 63/1416 |
| 2023/0164176 | A1 * | 5/2023 | Bjarnason | H04L 63/1416 726/23 |
| 2023/0388341 | A1 * | 11/2023 | Thiele | H04L 41/22 |
| 2024/0365121 | A1 * | 10/2024 | Northway | H04L 41/22 |

* cited by examiner

Figure 7:
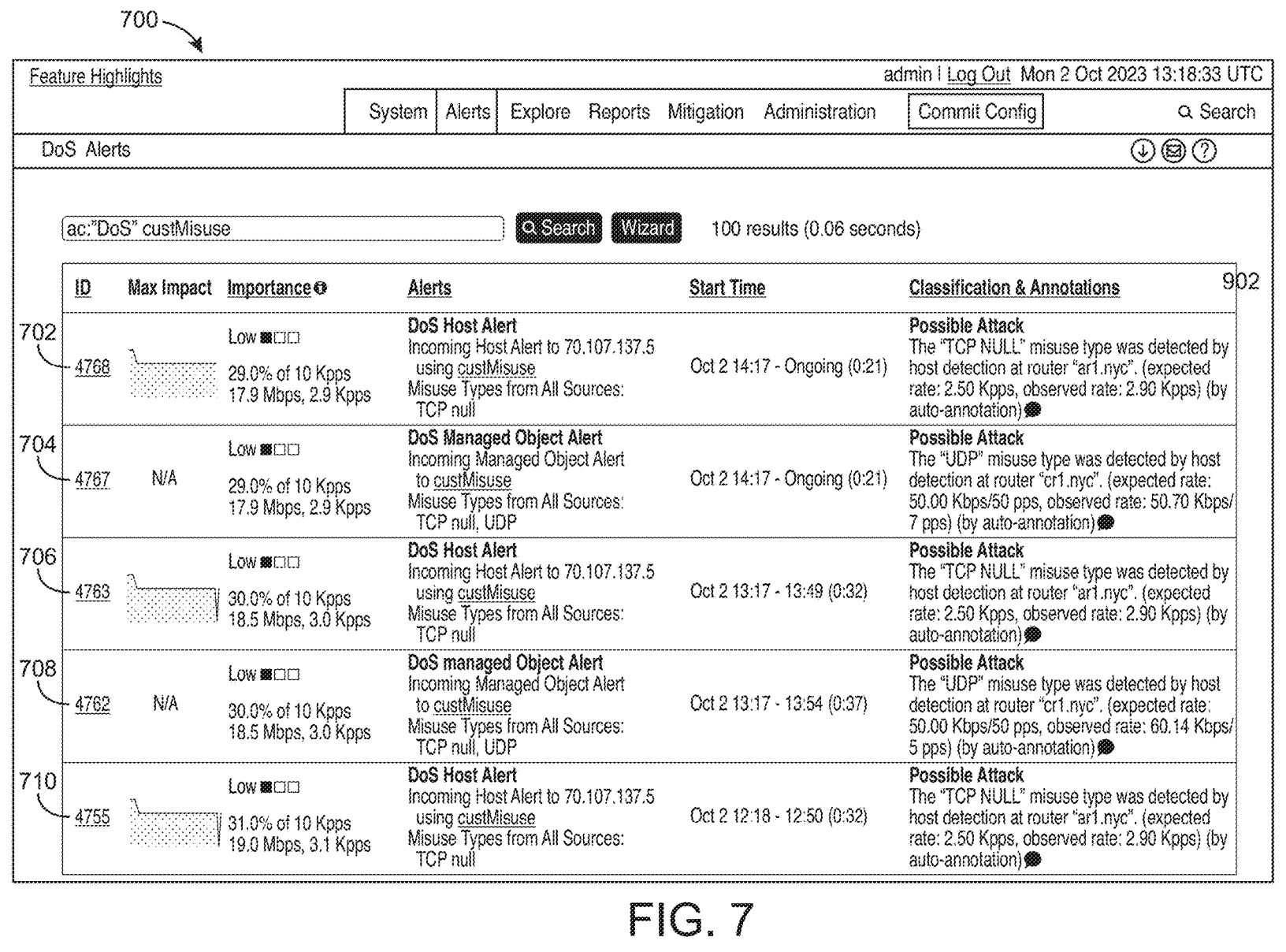

700

Feature Highlights admin | Log Out Mon 2 Oct 2023 13:18:33 UTC

System Alerts Explore Reports Mitigation Administration Commit Config Search

DoS Alerts ac:"DoS" custMisuse Search Wizard 100 results (0.06 seconds)

902

| ID | Max Impact | Importance | Alerts | Start Time | Classification & Annotations |
|---|---|---|---|---|---|
| 702 4768 | | Low 29.0% of 10 Kpps 17.9 Mbps, 2.9 Kpps | **DoS Host Alert** Incoming Host Alert to 70.107.137.5 using custMisuse Misuse Types from All Sources: TCP null | Oct 2 14:17 - Ongoing (0:21) | **Possible Attack** The "TCP NULL" misuse type was detected by host detection at router "ar1.nyc". (expected rate: 2.50 Kpps, observed rate: 2.90 Kpps) (by auto-annotation) |
| 704 4767 | N/A | Low 29.0% of 10 Kpps 17.9 Mbps, 2.9 Kpps | **DoS Managed Object Alert** Incoming Managed Object Alert to custMisuse Misuse Types from All Sources: TCP null, UDP | Oct 2 14:17 - Ongoing (0:21) | **Possible Attack** The "UDP" misuse type was detected by host detection at router "cr1.nyc". (expected rate: 50.00 Kbps/50 pps, observed rate: 50.70 Kbps/7 pps) (by auto-annotation) |
| 706 4763 | | Low 30.0% of 10 Kpps 18.5 Mbps, 3.0 Kpps | **DoS Host Alert** Incoming Host Alert to 70.107.137.5 using custMisuse Misuse Types from All Sources: TCP null | Oct 2 13:17 - 13:49 (0:32) | **Possible Attack** The "TCP NULL" misuse type was detected by host detection at router "ar1.nyc". (expected rate: 2.50 Kpps, observed rate: 2.90 Kpps) (by auto-annotation) |
| 708 4762 | N/A | Low 30.0% of 10 Kpps 18.5 Mbps, 3.0 Kpps | **DoS managed Object Alert** Incoming Managed Object Alert to custMisuse Misuse Types from All Sources: TCP null, UDP | Oct 2 13:17 - 13:54 (0:37) | **Possible Attack** The "UDP" misuse type was detected by host detection at router "cr1.nyc". (expected rate: 50.00 Kbps/50 pps, observed rate: 60.14 Kbps/5 pps) (by auto-annotation) |
| 710 4755 | | Low 31.0% of 10 Kpps 19.0 Mbps, 3.1 Kpps | **DoS Host Alert** Incoming Host Alert to 70.107.137.5 using custMisuse Misuse Types from All Sources: TCP null | Oct 2 12:18 - 12:50 (0:32) | **Possible Attack** The "TCP NULL" misuse type was detected by host detection at router "ar1.nyc". (expected rate: 2.50 Kpps, observed rate: 2.90 Kpps) (by auto-annotation) |

SYSTEMS AND METHODS FOR DETECTING THE ANOMALIES IN A COMMUNICATIONS NETWORK

CROSS-REFERENCE TO RELATED APPLICATIONS

This application claims the benefit of priority U.S. Provisional Application No. 63/587,331, filed Oct. 2, 2023, the entirety of which is incorporated by reference herein.

BACKGROUND

Distributed denial of service (DDOS) attacks are used by malicious actors to deny access to a given network service. Oftentimes, it can be difficult to detect DDOS attacks until well after the DDOS attacks have occurred, which can lead to significant damages to the attacked systems. Attempts to detect DDOS attacks may involve detecting sudden jumps in network use from a given source or network service provider. However, such attempts often lead to false positives and may be difficult to manage as a communications network changes configuration (e.g., as computing devices that communicate over the communications network are added or removed).

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 3A-10 are example user interfaces for setting thresholds for anomaly detection, in accordance with an implementation;

DETAILED DESCRIPTION

Figure 1:
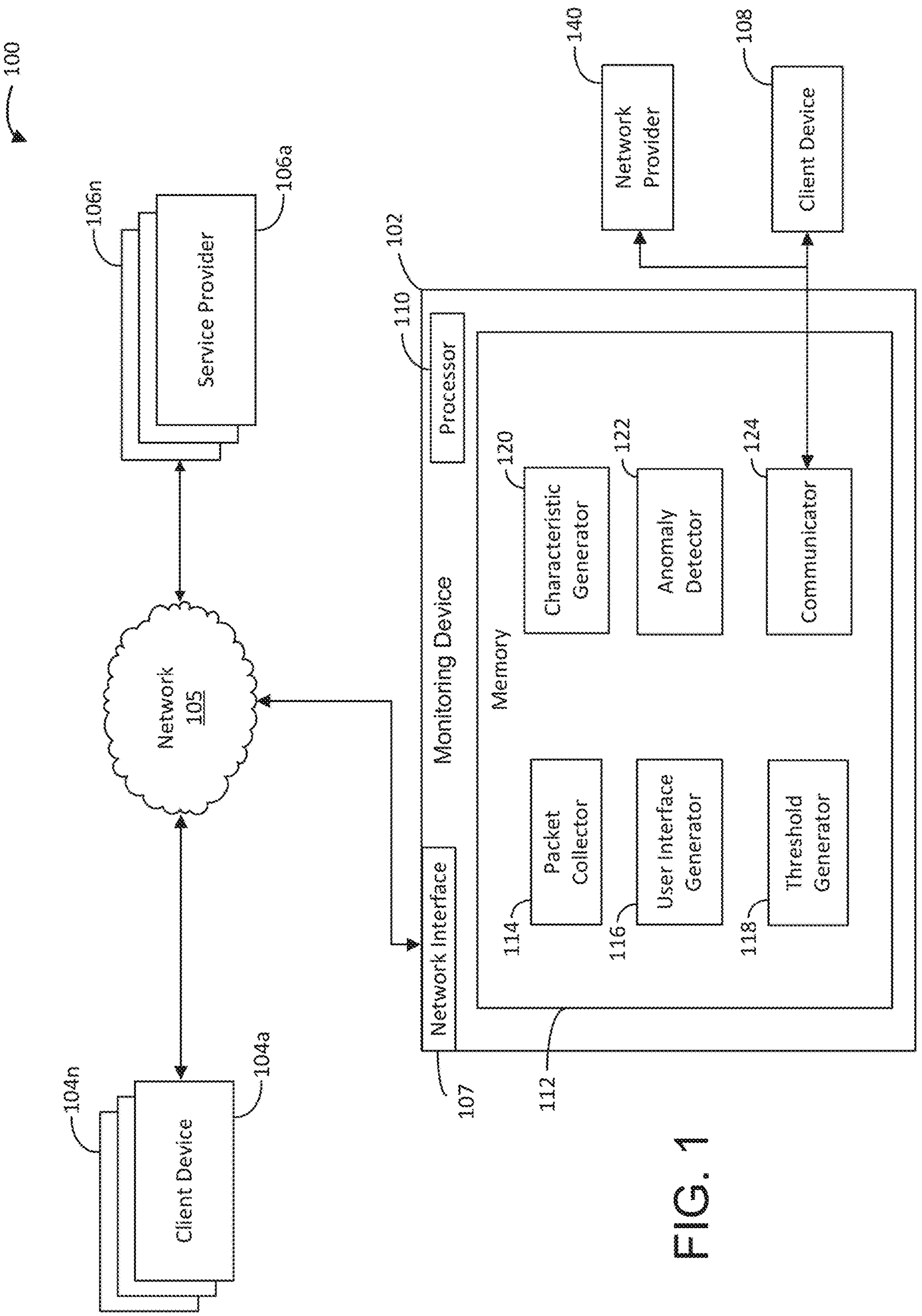
FIG. 1 is an illustration of an example system for distributed denial of service (DDoS) anomaly detection, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A network monitoring system may employ various techniques for detecting denial of service (DOS) attacks (e.g., DDOS attacks). In one example, a network monitoring system may monitor traffic flows per defined misuse type (e.g., monitor a potential network characteristic that may be attacked). The network monitoring system may compare network characteristics (e.g., network packet-per-second or bit-per-second) of the different traffic flows per misuse type to thresholds for the different misuse types. The thresholds may be input by a user or an administrator at a user interface generated by the network monitoring system. The user input thresholds may incur technical difficulties that may result in false positives or false negatives.

For example, because the thresholds may be provided by individual users, the network monitoring system may not be able to accurately detect attacks when a user does not know which values to choose for their thresholds. In the user interface provided by the network monitoring system, there may be two thresholds (e.g., a threshold for packets-per-second and a threshold for bits-per-second) that the user must enter for each misuse type which may be used to determine whether observed traffic triggers a low, medium, or high alert. The user interface may display fields for the user to input the thresholds for different managed objects (e.g., routers, switches, servers, etc.) of the communications network. In one example, the user interface may include fields for a user to enter values for thresholds for each of 25 (or any other number) built-in misuse types. The user interface may include such fields for two or more unit types (e.g., bits/second and/or packets/second). The user interface can include the option to set thresholds for additional (e.g., five) user-defined misuse types, which can add up to 94 or more fields configured to receive thresholds. The user can enter values for thresholds for individual managed objects via the user interface. The user interface can enable the user to do so for 470 potential thresholds or more for individual managed objects, for example. It can be difficult for the user to accurately input values for such a large number of thresholds, particularly when the user may be responsible for maintaining hundreds or thousands of managed objects of a communications network at a time.

When selecting thresholds to use for anomaly detection, users may make guesses based on the number of alerts that they expect to see generated. The cycle of pick, save, wait, watch, evaluate, and adjust again often becomes "range-finding" where their initial guess is too low, and results in generating too many alerts. Users may adjust the threshold value to be higher to lower the number of alerts, only to find that system is not detecting a few attacks, so the users may adjust the threshold to be lower again. Users may repeat this process a large number of times until the users feel that they have chosen the right value. Unfortunately, these wins are temporary. Attackers often shift their tactics and methodologies, which can require users to engage in a fresh round of range-finding.

One attempt to overcome this technical problem of anomaly detection in a communications network is to perform a detailed examination of each misuse type. However, each examination can require a new expensive (e.g., processor resource intensive) data query.

A computer implementing the systems and methods described herein may overcome the aforementioned technical deficiencies. The computer may do so using a method of automatic generation of detection thresholds mixed with human influence to select different sensitivities. For example, the computer can generate and present a user interface at a computing device. The user interface can include different fields for different misuse types that are configured to receive values via a user input. The fields may correspond to thresholds that the computer may use for automatic anomaly detection for the particular misuse type for a managed object. The user interface can also include a button to automatically generate one or more thresholds for the different fields. A user can select the button to cause the computer to auto-populate the different fields with values to use as thresholds for anomaly detection for the different misuse types for the different managed objects. The user can view the populated values, adjust the values, and/or select an option to apply the values as the thresholds as adjusted or unadjusted. The computer can then use the thresholds to detect anomalies or attacks for the different misuse types and/or managed objects of the communications network based on the data that the computer collects from communication across the communications network by the different managed objects.

For example, when generating or editing a user interface for detection type settings within a managed object, the computer can include an array of numeric input boxes (e.g., fields) to enter thresholds for different network characteristics (e.g., packets-per-second or bits-per-second) associated with the managed object. The computer can include a button on the user interface that a user can press to open a modal dialog window. The window can include determined values for thresholds that the user can select or skip to populate the numeric input boxes. If applied, then the user interface may update the fields with the applied values. The user accessing the user interface may adjust or fine-tune the populated values and continue on to other tabs and/or otherwise save the changes. The user interface may reduce the amount of time and effort needed by the user to configure the system for anomaly detection and/or may improve the precision of the threshold values selected.

The computer can determine the suggested values to use as thresholds for different misuse types for managed objects, per collector, per router, per misuse type, etc., based on historical traffic data for the respective misuse types and/or managed objects. For example, the computer can collect timeseries data for each of the different misuse types for each of the managed objects of the communications network that the computer is monitoring for a first time period (e.g., a time period including a defined time into the past up until the current time). The timeseries data can correspond to different network characteristics, such as packets-per-second or bits-per-second. The computer can assign the data into bins which each correspond to a different time window of the first time period. The computer can determine a bin value for each bin (e.g., based on a function such as an average or median of the data in each respective bin). The computer can identify a bin value for a defined percentile (e.g., the 95th percentile) of bin values for the bins for each network characteristic for each misuse type for each managed object. The computer can multiply the bin values by a defined value to determine a predicted threshold for each network characteristic for each misuse type for each managed object. The computer can populate the fields of the respective network characteristics, misuse types, and/or managed objects with the corresponding thresholds. The user can adjust and/or otherwise select an option to apply the thresholds to use the thresholds for anomaly detection for a time period subsequent to the first time period.

A. Communications Network Attack Mitigation System

FIG. 1 illustrates an example system 100 for detecting DDOS anomaly detection, in some embodiments. The system 100 may provide improved network monitoring of a communications network to detect attacks on the communications network. In brief overview, the system 100 can include a monitoring device 102 that receives and/or stores data packets transmitted via a network 105 between client devices 104*a-n* (hereinafter client device 104 or client devices 104) and service providers 106*a-n* (hereinafter service provider 106 or service providers 106). The service providers 106 can each include a set of one or more servers 1102, depicted in FIG. 11A, or a data center 1108. The monitoring device 102 can generate a user interface that includes fields configured to receive thresholds for different misuse types across managed entities of the network 105. The monitoring device 102 can transmit the user interface to a client device 108. A user of the client device 108 can select a button on the user interface that causes the monitoring device 102 to automatically populate the different fields with suggested or predicted thresholds, which the monitoring device 102 may determine based on network packets transmitted across the network 105 between different computing devices (e.g., between the client devices 104 and the service providers 106). The user of the client device 108 can accept or adjust the thresholds and select an apply button. The monitoring device 102 can receive the selection and detect anomalies (e.g., attacks) in the network 105 using the applied thresholds. In this way, the monitoring device 102 can enable a configurable anomaly detection system to detect anomalies in the network 105, such as a DDOS attack or a DOS attack.

The monitoring device 102, the client devices 104, the service providers 106, and/or the client device 108 can each include or execute on one or more processors or computing devices (e.g., the computing device 1103 depicted in FIG. 11C) and/or communicate via the network 105. The network 105 can be a communications network and can include computer networks such as the Internet, local, wide, metro, or other area networks, intranets, satellite networks, and other communication networks such as voice or data mobile telephone networks. The network 105 can be used to access information resources such as web pages, websites, domain names, or uniform resource locators that can be presented, output, rendered, or displayed on at least one computing device (e.g., client device 104), such as a laptop, desktop, tablet, personal digital assistant, smartphone, portable computers, or speaker. In some embodiments, the network 105 may be or include a self-organizing network that implements a machine learning model to automatically adjust connections and configurations of network elements of the network 105 to optimize network connections (e.g., minimize latency, reduce dropped calls, increase data rate, increase quality of service, etc.).

Each of the monitoring device 102, the client devices 104, the service providers 106, and/or the client device 108 can include or utilize at least one processing unit or other logic device such as a programmable logic array engine, or module configured to communicate with one another or other resources or databases. The components of the monitoring device 102, the client devices 104, the service providers 106, and/or the client device 108 can be separate components or a single component. The system 100 and its components can include hardware elements, such as one or more processors, logic devices, or circuits.

Still referring to FIG. 1, and in further detail, the system 100 can include the service providers 106. The service providers 106 may each be or include servers or computers configured to transmit or provide services across network 105 to the client devices 104. The service provider 106 can be or include host computing devices. The service providers 106 may transmit or provide such services upon receiving requests for the services from any of the client devices 104. The term "service" as used herein includes the supplying or providing of information over a network, and is also referred to as a communications network service. Examples of services include 5G broadband services, any voice, data, or video service provided over a network, smart-grid network, digital telephone service, cellular service, Internet protocol television (IPTV), etc.

The client devices 104 can include or execute applications to receive data from the service providers 106. For example, a client device 104 may execute a video application upon receiving a user input selection that causes the client device 104 to open the video application on the display. Responsive to executing the video application, a service provider 106 associated with the video application may stream a requested video to the client device 104 in a communication session. In another example, a client device 104 may execute a video game application. Responsive to executing the video game application, a service provider 106 associated with the video game application may provide data for the video game application to the client device 104. In another example, the client device 104 can execute a browser application that enables a user to browse the Internet. The client devices 104 can be host computing devices, in some cases.

A client device 104 can be located or deployed at any geographic location in the network environment depicted in FIG. 1. A client device 104 can be deployed, for example, at a geographic location where a typical user using the client device 104 would seek to connect to a network (e.g., access a browser or another application that requires communication across a network). For example, a user can use a client device 104 to access the Internet at home, as a passenger in a car, while riding a bus, in the park, at work, while eating at a restaurant, or in any other environment. The client device 104 can be deployed at a separate site, such as an availability zone managed by a public cloud provider (e.g., a cloud 1110 depicted in FIG. 11B). If the client device 104 is deployed in a cloud 1110, the client device 104 can include or be referred to as a virtual client device or virtual machine. In the event the client device 104 is deployed in a cloud 1110, the packets exchanged between the client device 104 and the service providers 106 can still be retrieved by network monitoring equipment or the monitoring device 102 from the network 105. The client device 108 may be similar to the client devices 104. In some cases, the monitoring device 102 and/or the client devices 104 can be deployed in the cloud 1110 on the same computing host in an infrastructure 1116 (described below with respect to FIG. 11).

The monitoring device 102 may comprise one or more processors that are configured to receive data packets of communication between the client devices 104 and/or the service providers 106 across the network 105 for anomaly detection. The monitoring device 102 may comprise a network interface 107, a processor 110, and/or memory 112. The monitoring device 102 may communicate with network monitoring equipment (e.g., a probe monitoring data packets transmitted across a mobile communications network), in some embodiments. The processor 110 may be or include an ASIC, one or more FPGAs, a DSP, circuits containing one or more processing components, circuitry for supporting a microprocessor, a group of processing components, or other suitable electronic processing components. In some embodiments, the processor 110 may execute computer code or modules (e.g., executable code, object code, source code, script code, machine code, etc.) stored in the memory 112 to facilitate the operations described herein. The memory 112 may be any volatile or non-volatile computer-readable storage medium capable of storing data or computer code.

The memory 112 may include a packet collector 114, a user interface generator 116, a threshold generator 118, a characteristic generator 120, an anomaly detector 122, and/or a communicator 124, in some embodiments. In brief overview, the components 114-124 may monitor communication sessions between the client devices 104 and the service providers 106 over the network 105. In doing so, the components 114-124 can collect data packets transmitted between the client devices 104 and the service providers 106. The components 114-124 can determine thresholds for different misuse types for different managed objects based on the collected data. The components 114-124 can auto-populate fields on a user interface with the determined thresholds that a user can adjust or otherwise apply to use for subsequent anomaly detection at the respective misuse types and/or managed objects. The components 114-124 can use the thresholds to detect attacks or anomalies in communication across the network 105.

The packet collector 114 may comprise programmable instructions that, upon execution, cause the monitoring device 102 to receive or collect data being transmitted across the network 105. The packet collector 114 may collect network data packets of different communication sessions communication sessions occurring over the network 105 between client devices 104 and/or service providers 106. The packet collector 114 can collect the network data packets from one or more connections with the network 105 itself or by receiving the network data packets from network monitoring equipment that is connected with the network 105. The packet collector 114 can continuously collect network data packets over time to use for threshold generation and/or anomaly detection.

The user interface generator 116 may comprise programmable instructions that, upon execution, cause the monitoring device 102 to generate and/or update a user interface displayed at different computing devices. In one example, the user interface generator 116 can be a component of an application hosted by the monitoring device 102. The application can be user accessible (e.g., in a software-as-a-service (SaaS) environment) by different computing devices. The application can be configurable to detect anomalies (e.g., attacks) in the network 105 based on network data packets that are transmitted across the network 105 and collected by the packet collector 114.

For example, the user interface generator 116 can generate a user interface that includes one or more fields. The one or more fields can be configured to receive values (e.g., numerical values) for use to determine or use as thresholds for anomaly detection for different misuse types (e.g., a type of network flow such as user datagram protocol (UDP) or transmission control protocol (TCP) or a type of network attack, such as SYN/ACK Amplification, domain name service (DNS) amplification) and/or managed objects (e.g., representations of one or more computing devices transmitting or otherwise participating in communication across the network 105). The user interface can include such fields for different network characteristics, such as packets-per-second and/or bits-per-second. The user interface generator 116 can include a threshold calculation button in the user interface. Upon receipt of a section of the threshold calculation button, the user interface generator 116 can automatically determine and/or select predicted or suggested thresholds to populate into one or more of the fields on the user interface. The user interface generator 116 can include a single button to auto-populate each of the fields on the user interface or include separate buttons for separate fields or fields of individual managed objects. The user interface generator 116 can transmit the user interface to the client device 108, in some cases in response to receiving a request from the client device 108.

The client device 108 can present the user interface on a display. A user accessing the client device 108 can either input values for thresholds into the different fields or select one or more of the threshold calculation buttons on the user interface. Responsive to receiving a selection of a threshold calculation button on the user interface, the user interface generator 116 can automatically populate the fields that correspond to the selected threshold calculation button with a value that the threshold generator 118 generated or determined for the respective fields. In some embodiments, the user interface can include selectable options for each field. A user can select the options for the fields for which the user would like a threshold to be calculated. The user can select a threshold calculation button to cause the user interface generator 116 to automatically populate the selected fields.

The threshold generator 118 may comprise programmable instructions that, upon execution, cause the processor 110 to generate, predict, or suggest thresholds to use for anomaly detection. The threshold generator 118 can generate such thresholds for one or more (e.g., each of) the fields of the user interface. The threshold generator 118 can generate the thresholds based on historical timeseries data of the traffic flows for the respective fields. For example, the threshold generator 118 can identify the data packets of traffic flows that the monitoring device 102 monitors for the respective fields of the user interface. The threshold generator 118 can identify the network data packets collected within the first time period. The threshold generator 118 can assign the network data packets into one or more bins (e.g., time windows) corresponding to the times in which the data packets were generated or the packet collector 114 collected the respective network data packets. The threshold generator 118 can determine bin values for network characteristics of the bins for the respective misuse types and/or managed objects such as, for example and for each bin, the average or median packet-per-second or bit-per-second. The threshold generator 118 can determine or select a bin value of the determined bin values for the bins at a defined percentile of each network characteristic of each misuse type for each managed object. The threshold generator 118 can use the determined or selected bin value as the threshold for the network characteristic of each misuse type for each managed object or determine the threshold based on or as a function of the determined bin value for the network characteristic of each misuse type for each managed object.

For example, to determine a threshold for a network characteristic of a misuse type for a managed object, the threshold generator 118 can multiply the bin value determined as a percentile for the network characteristic of the misuse type for the managed object by a defined value. The output of the multiplication can be the threshold. The threshold generator 118 can use any function to determine the threshold based on the bin values for the different bins. The user interface generator 116 can automatically populate the fields on the user interface displayed at the client device 108 with the thresholds generated by the threshold generator 118.

In another example, the threshold generator 118 can determine multiple thresholds for individual network characteristics of a misuse type for a managed object. To do so, the threshold generator 118 can multiply the bin value determined at a percentile for the network characteristic of the misuse type for the managed object by a plurality of defined values. In one example, the plurality of defined values can correspond to different rates of anomaly detection. For instance, the lower defined values can cause anomalies to be detected more often than higher defined values because the lower defined values can cause the thresholds to be lower than the higher defined values. The threshold generator 118 can determine multiple possible thresholds for each field that correspond to different degrees or levels of anomaly detection. The user accessing the client device 108 can select an option indicating a degree or level of anomaly detection (e.g., anomaly detection level). In one example, the user interface generator 116 can include a selectable button for each anomaly detection level (e.g., a plurality of selectable buttons) on the user interface. The user can select a selectable button that corresponds to an anomaly detection level to cause the threshold generator 118 to generate a threshold for the anomaly detection level for a field or multiple fields (e.g., multiple selected fields). The user interface generator 116 can identify the threshold for the field or fields that correspond to the degree or level of anomaly detection. The user interface generator 116 can populate the fields with the thresholds determined and/or selected for the respective thresholds.

In another example, the threshold generator 118 can generate thresholds for individual network characteristics using different functions. For example, the threshold generator 118 can determine a threshold for a trigger rate for a traffic flow filtered by the view of the current managed object, per misuse type, and by the maximum data point per binned router. In this case, the threshold generator 118 can identify the routers (e.g., all of the routers) involved in the traffic, and use the largest data point for each minute from those routers. The threshold generator 118 can determine a threshold for a high severity rate on a minute-by-minute basis by determining the maximum data point of the following sources: (1) the trigger rate as described above, (2) the sum of (view of the current managed object, per misuse type, at the managed object boundary), and (3) the sum of (view of the current managed object, per misuse type, at the network boundary). The threshold generator 118 can determine a defined percentile for the time series data generated for the trigger rate and the high severity rate to determine a bin value for each of the trigger rate and the high severity rate. The threshold generator 118 can multiply the determined bin values for the trigger rate and the high severity rate by different defined values to determine thresholds for the fields corresponding to the misuse type and managed objects of the determined bin values for the trigger rate and the high severity rate. The threshold generator 118 can similarly determine multiple thresholds for fields for any number of individual network characteristics for misuse types and managed objects.

For example, the threshold generator 118 can determine two thresholds for detection of anomalous levels of traffic: a trigger rate threshold (e.g., the traffic rate that causes the monitoring device 102 to generate an alert) and a high severity rate threshold (e.g., the traffic rate that the monitoring devices 102 uses to differentiate between low, medium, and high alert severities). If traffic exceeds the high severity rate threshold for a defined duration (e.g., a severity duration), then the monitoring device 102 can classify the alert as high severity. If traffic exceeds the high severity rate threshold rate for a time threshold but less than the defined duration (e.g., for at least one minute, but for less than the defined duration), then the monitoring device can classify the alert as medium severity. If traffic exceeds 75% of the high severity rate threshold for the defined duration, then the monitoring device can classify the alert as medium severity. If none of these criteria are met, then the monitoring device 102 can classify the alert as low severity. The network traffic which is examined can be different for each of these thresholds.

In one example, the threshold generator 118 can determine the trigger rate threshold using a single dataset. The dataset can include traffic (e.g., network traffic) that has a defined set of attributes, such as a combination of (1) a particular entity associated with the network traffic (e.g., ACME Co.), and (2) a particular misuse type (e.g., connectionless lightweight directory access protocol (CLDAP) amplification). This means that the traffic must match both of those attributes to be included in the dataset used to determine the trigger rate threshold, and that, of the various routers that such traffic was observed on, the threshold generator 118 can use the dataset from the router which saw or routed the most traffic. For example, traffic may be reported to have been observed from six different routers, if the router with the maximum traffic (e.g., the highest amount of traffic of the routers) is named "123-Chicago", then the traffic used here must match the attributes of ACME Co., CLDAP Amplification, and 123-Chicago.

As for the high severity threshold, the dataset described above with respect to the trigger rate threshold is one of three datasets that can be used to generate the high severity rate threshold. The threshold generator 118 can analyze three different datasets and identify the maximum data points from the datasets to determine the high severity rate threshold. In doing so, the threshold generator 118 can use, for example, the same dataset used to determine the trigger rate threshold; the dataset of network traffic having the attributes of the same current managed object and misuse type and be collected from or at the managed object boundary of the current managed object; and the dataset of network traffic having the attributes of the same current managed object and misuse type and be collected from or at the network boundary of the communications network (e.g., the network 105).

The network boundary can be defined as the border between a network (e.g., a local network) and the rest of the Internet. This boundary can be used to determine when and where traffic enters your network and to determine configured managed objects, such as individual entities (e.g., corporations or customers).

The monitoring device 102 can monitor or analyze all "in" and "out" traffic for a managed object at its interface boundaries. In doing so, the monitoring device 102 can avoid counting flows more than once when the monitoring device 102 detects a managed object's traffic at multiple routers in a network. The boundaries can also enable the monitoring device 102 to have more fine-grained visibility into a network's traffic, such as entity-to-entity (e.g., customer-to-customer) traffic.

In one example, to determine the "maximum data points" for the datasets, each of the datasets may contain a data point per minute. For instance, the monitoring device 102 can analyze seven days worth of data points, which can amount to 604800 data points in each of these three datasets. The threshold generator 118 can analyze the points for each minute, and identify the point with the maximum value. The threshold generator 118 can then examine the three data points for the next minute and identify the max data point based on the examination or comparison, and so forth. After identifying the maximum data points, the threshold generator 118 can identify the 95th percentile (or any other percentile or defined percentile) of that dataset and then apply a multiplier reflecting a sensitivity level (e.g., a sensitivity level selected by the user). In doing so, the threshold generator 118 can identify the high severity alert threshold.

In performing the aforementioned process of threshold generation, the threshold generator 118 can adjust or use different parameters. For example, the threshold can adjust the length of the duration of the datasets, the number of data points per minute (or minutes per data point), the algorithm applied to choose the threshold from the datasets, the use of a percentile, the use of a particular percentile (e.g., the 95th percentile can be modified or changed), the use and/or magnitude of a sensitivity multiplier, the choice of which datasets to match on, etc. Such parameters can be adjusted based on a user input, in some cases.

The user accessing the client device 108 can view and/or adjust the thresholds in the fields populated by the user interface generator 116. The user can do so, for example, by adjusting the values in the fields as the values are populated. The user can adjust all or a subset of the values in the fields. The user can select a button on the user interface to apply the values upon completion of adjusting the values in the fields. The monitoring device 102 can receive the values from the user interface as thresholds to use to detect anomalies in the network 105.

For example, subsequent to receiving the selection of the thresholds, the packet collector 114 can collect (e.g., continue to collect) network data packets transmitted across the network 105. The characteristic generator 120 can analyze the data packets to generate network characteristics of the network 105. The characteristic generator 120 may comprise programmable instructions that, upon execution, cause the processor 110 to generate network characteristics of communication across the network 105. The characteristic generator 120 can determine network characteristics (e.g., packet-per-second and/or bit-per-second) of the different network flows (e.g., communication sessions) between computing devices or managed objects. The characteristic generator 120 can determine such network characteristics for the different misuse types such that the characteristic generator 120 generates characteristics for the different fields of the user interface into which the client device 108 submitted thresholds for anomaly detection.

The anomaly detector 122 may comprise programmable instructions that, upon execution, cause the processor 110 to detect or determine anomalies at one or more misuse types and/or managed objects in the network 105. An anomaly can be or indicate a cyberattack, such as a DDOS attack or another type of Acceptable Use Policy violation at a computing device, network, or managed object. The anomaly detector 122 can detect anomalies at computers (e.g., service providers 106) hosting services for different client devices 104 or that are otherwise associated with the network 105. The anomaly detector 122 can detect anomalies at the network 105 itself. The anomaly detector 122 can detect an anomaly, for example, by comparing the values of the network characteristics determined or generated by the characteristic generator 120 with the thresholds of the corresponding fields of the user interface. The anomaly detector 122 can detect an anomaly when a value of a network characteristic exceeds the threshold corresponding to the network characteristic.

The communicator 124 may be or comprise executable instructions that, upon execution by the processor 110, may facilitate communication between the monitoring device 102 and the client device 108 and/or the network provider 140. The communicator 124 can be an application programming interface (API). The communicator 124 can transmit records (e.g., files, documents, tables, listings, messages, notifications, etc.) or alerts of anomalies to the client device 108 or the network provider 140 responsive to detecting an anomaly. For example, the communicator 138 may generate an alert (e.g., an alert in a record) indicating an anomaly and data regarding the anomaly, such as data regarding the computing device or computing devices transmitting network data packets that caused the anomaly, the misuse type of the anomaly, the managed object of the anomaly, the threshold of the anomaly, the amount by which the threshold was exceeded, etc. The communicator 138 can transmit the alert to the client device 108 for display. The communicator 138 may transmit the alert to the client device 108 or the network provider 140 responsive to a request from the client device 108 or the network provider 140. The communicator 138 can transmit the user interface generated by the user interface generator 116 to the client device 108, such as for display at the client device 108. The communicator 138 can transmit the record to the network provider 140 to update the user interface, such as for use to control or adjust the network 105 to improve network performance. The monitoring device 102 can generate and/or transmit such records and/or user interfaces for each anomaly that the anomaly detector 122 detects.

The network provider 140 can reorganize the network 105 according to the records containing anomaly information that the network provider 140 receives from the communicator 138. The network provider 140 can do so in response to a request or message from the monitoring device 102 or the client device 108. For example, the network provider 140 can throttle (e.g., stop or limit) any requests from the computing devices identified as being anomalous and/or transmitting anomalous data packets. In another example, the anomaly can correspond a computing device transmitting a number of data packets or a number of bits across the communications network that exceeds a threshold. The network provider 140 can reorganize the communications network by adjusting a capability of the computing device to communicate across the communications network. The network provider 140 can reorganize the network in any way based on the messages or alerts. In one example, responsive to identifying the individual computing devices that are the cause of a DDOS attack, the network provider 140 can mitigate (e.g., automatically mitigate) traffic by targeting (e.g., throttling) only those devices. The network provider 140 can mitigate the anomaly or attack based on a mitigation type received from the monitoring device 102 or the client device 108. The mitigation type may be received at the user interface generated and transmitted by the user interface generator 116 to the client device 108. In some embodiments, the monitoring device 102 can reorganize the network 105 in the same or a similar manner to the network provider 140.

Figure 2:
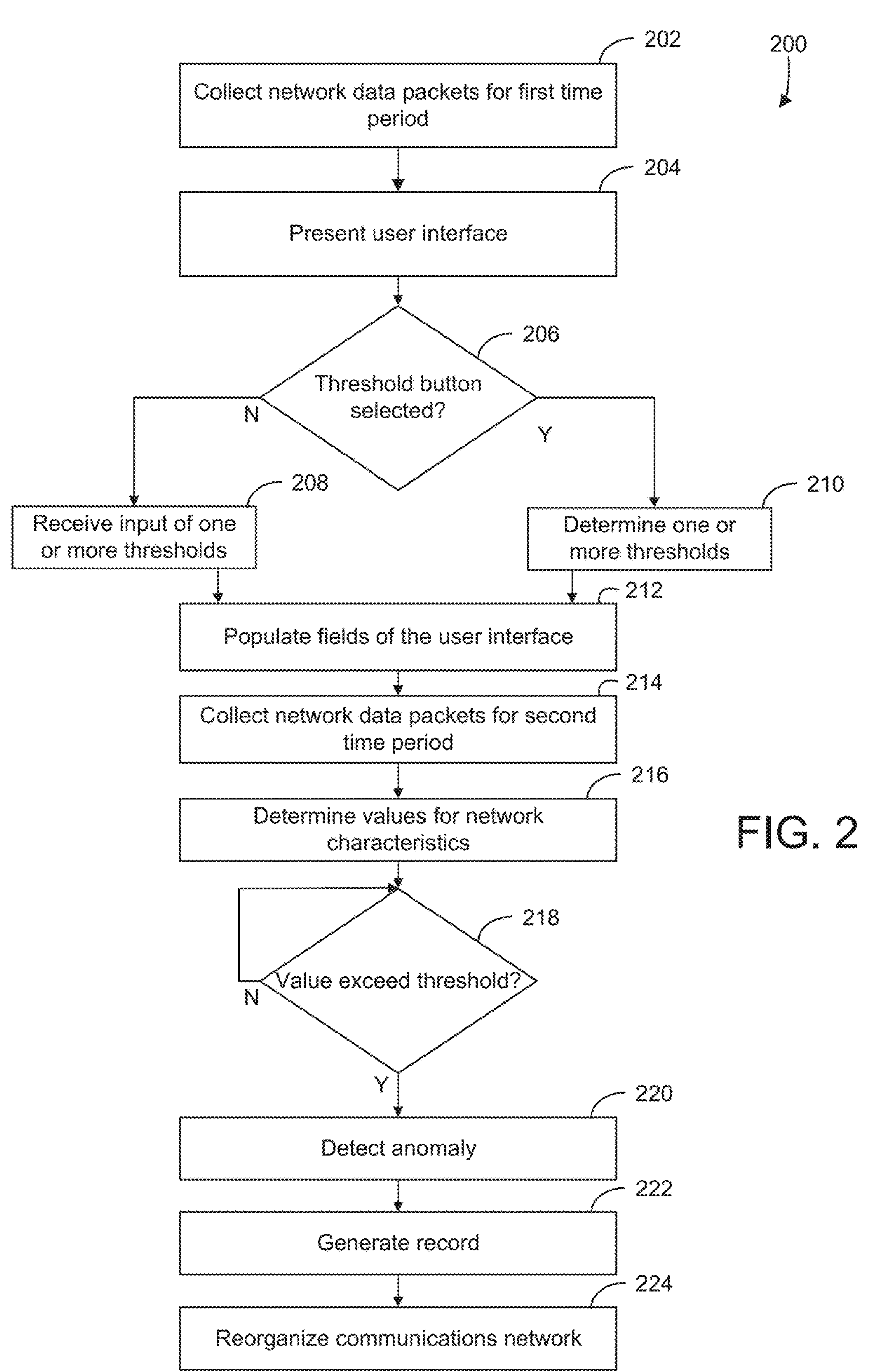
FIG. 2 is an example method for DDOS anomaly detection, in accordance with an implementation.
Figure 3A:
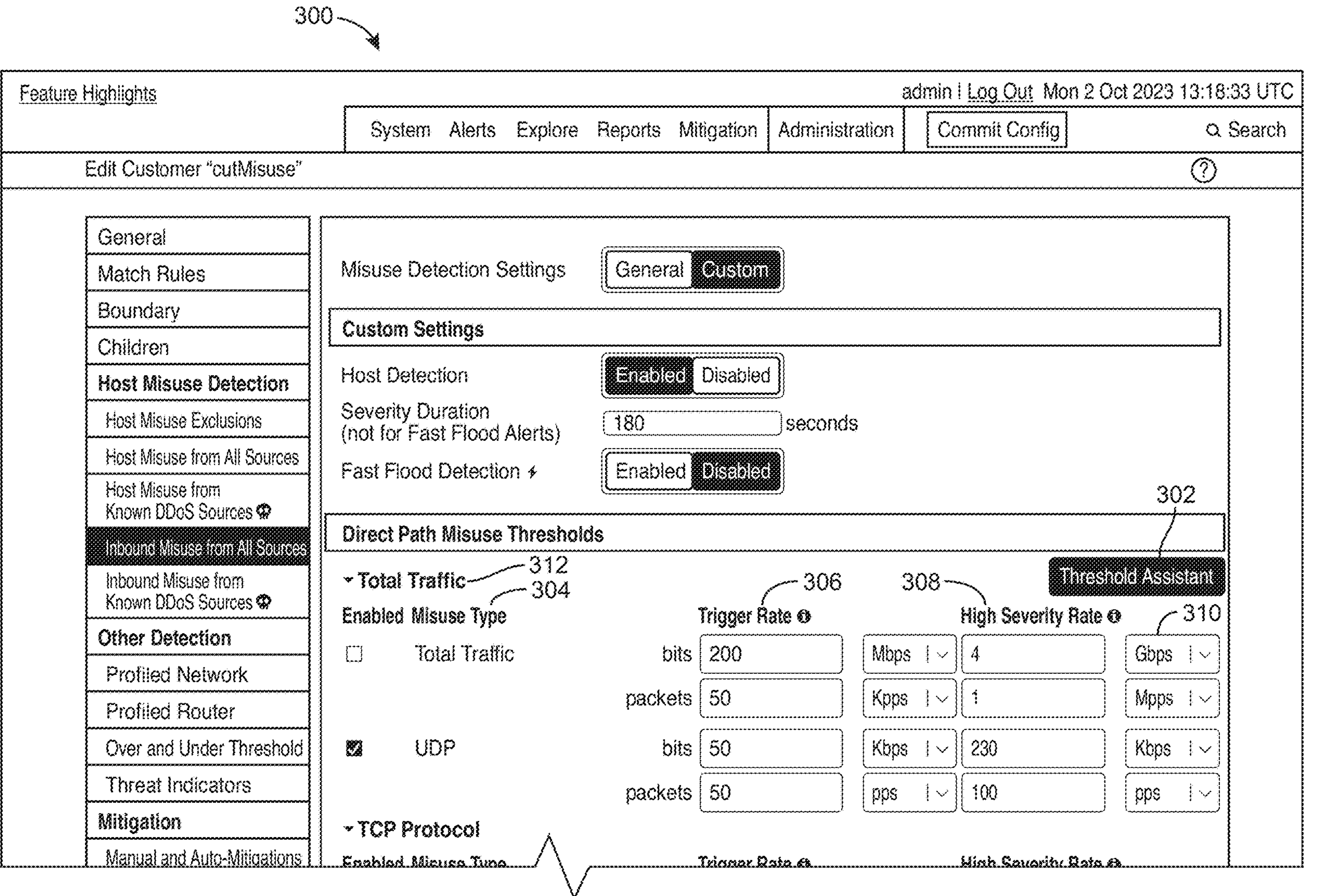
Figure 3B:
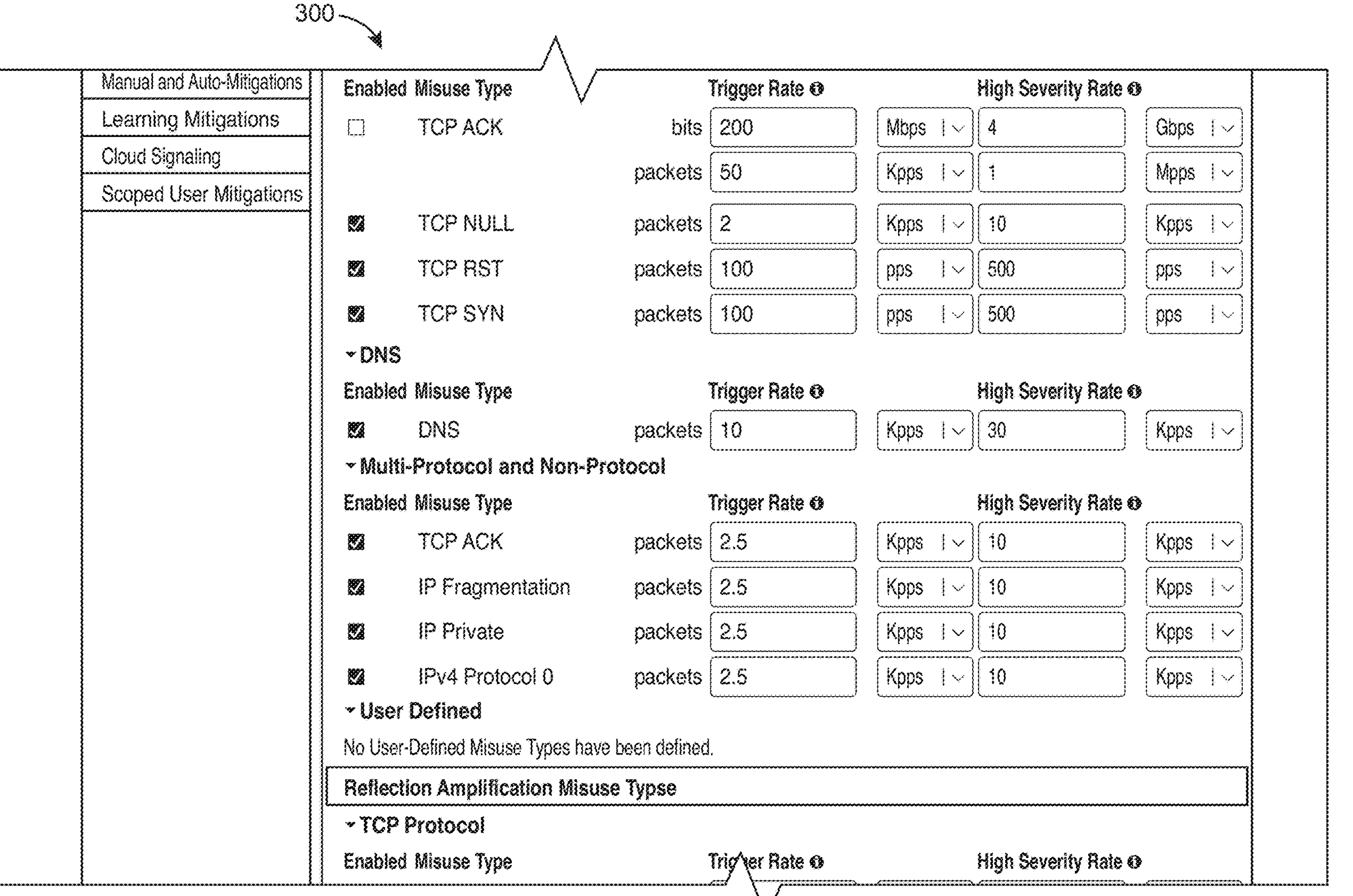
Figure 3C:
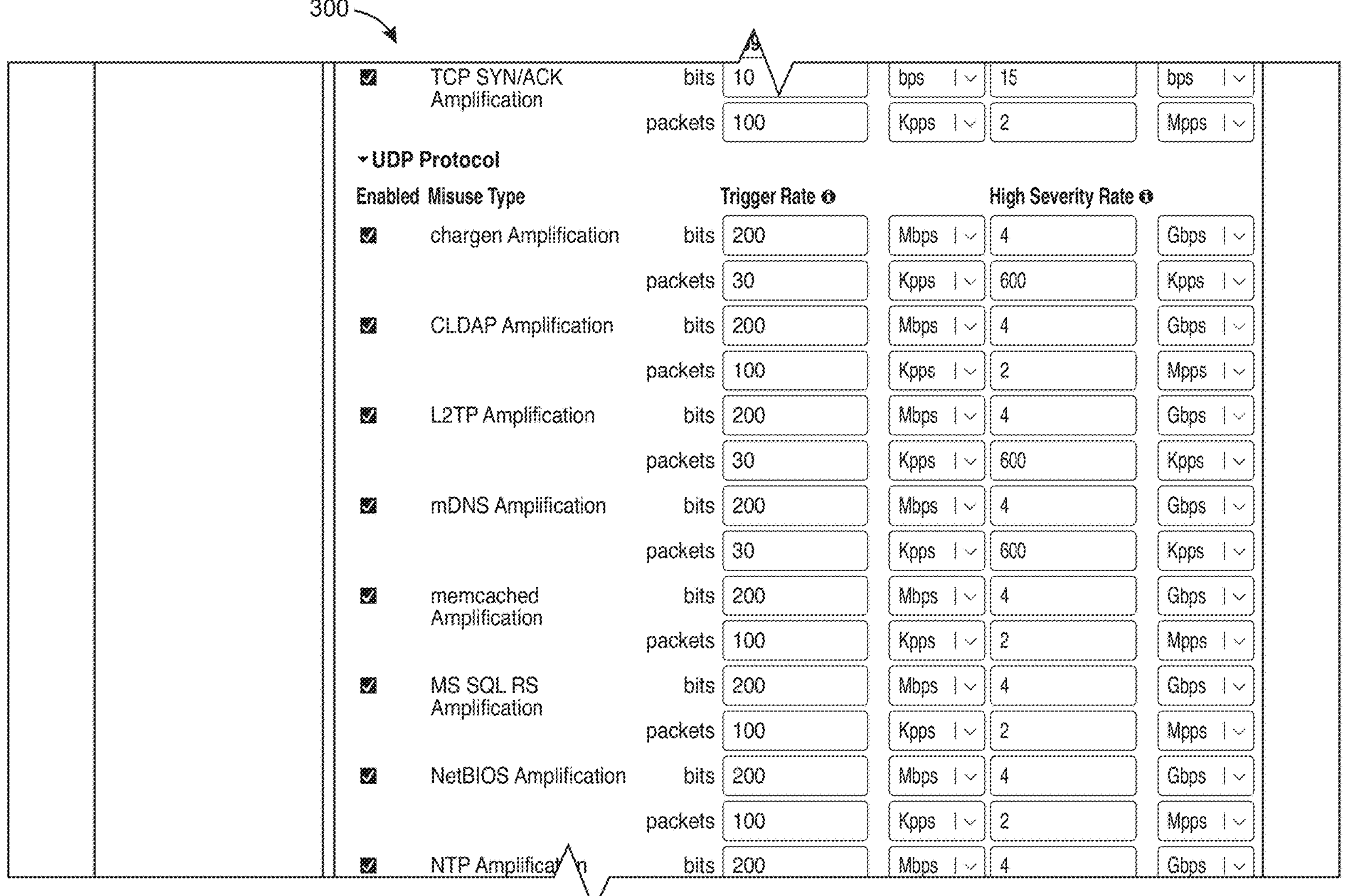
Figure 3D:
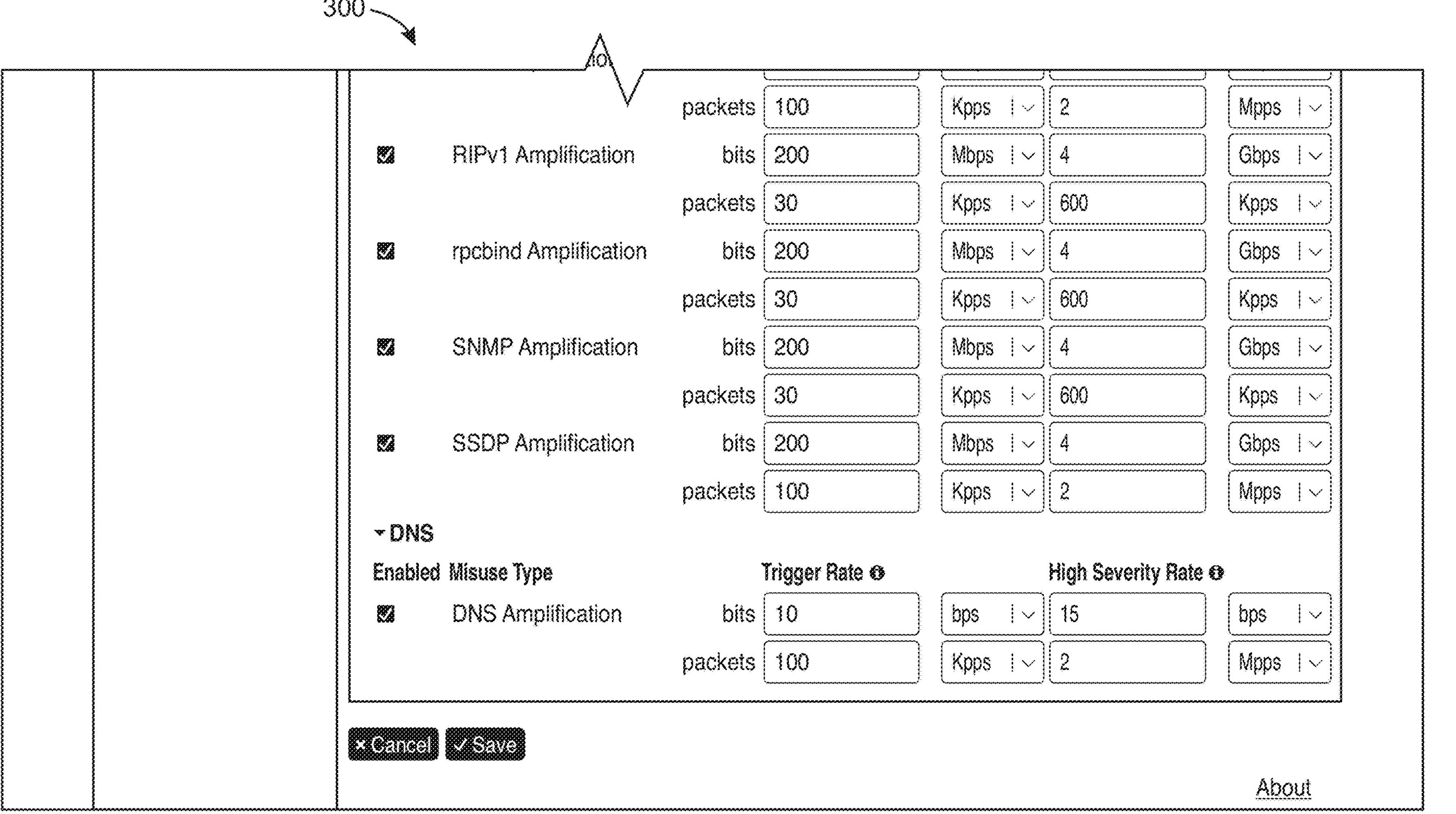
Figure 4:
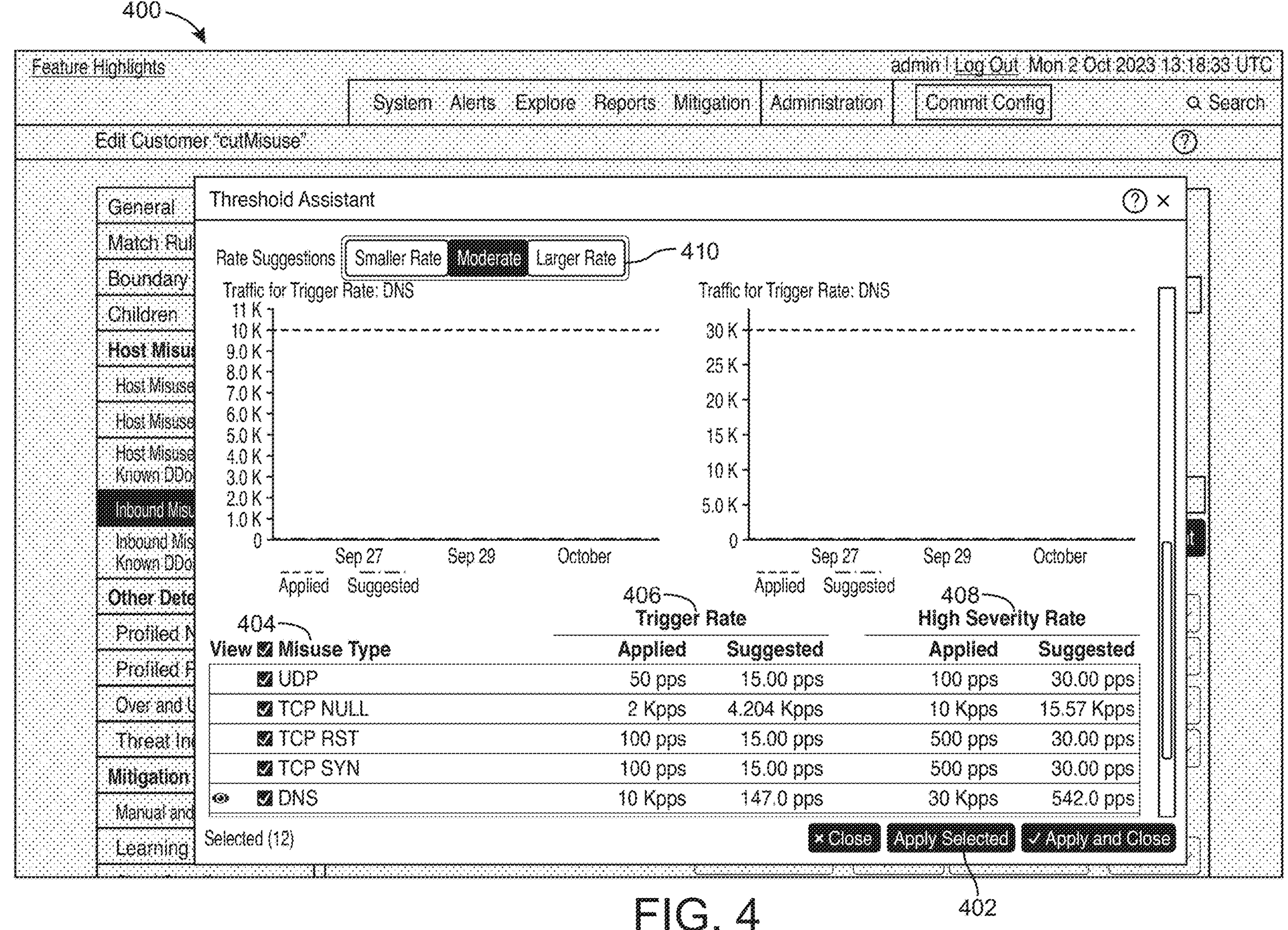
Figure 5:
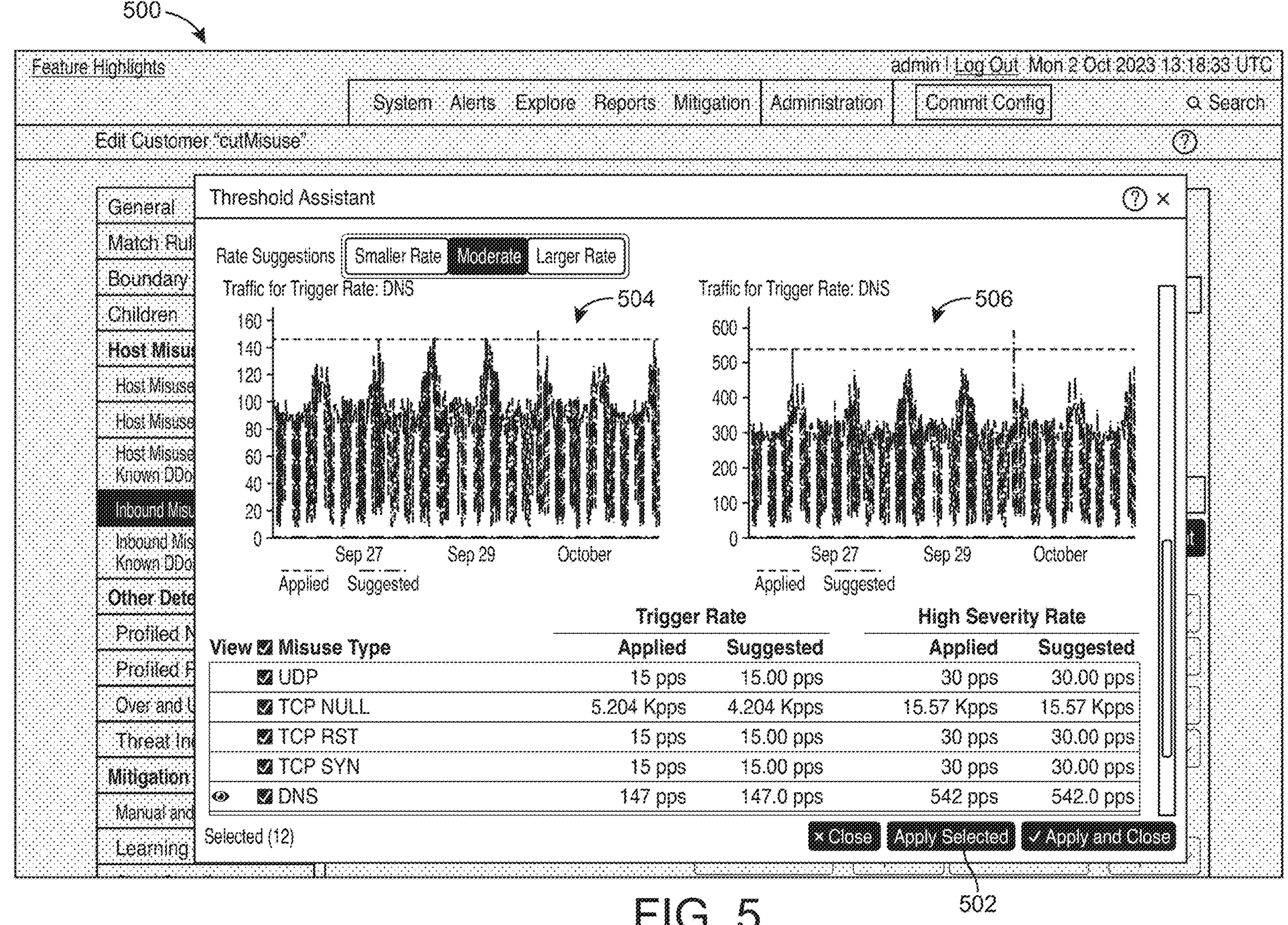
Figure 6A:
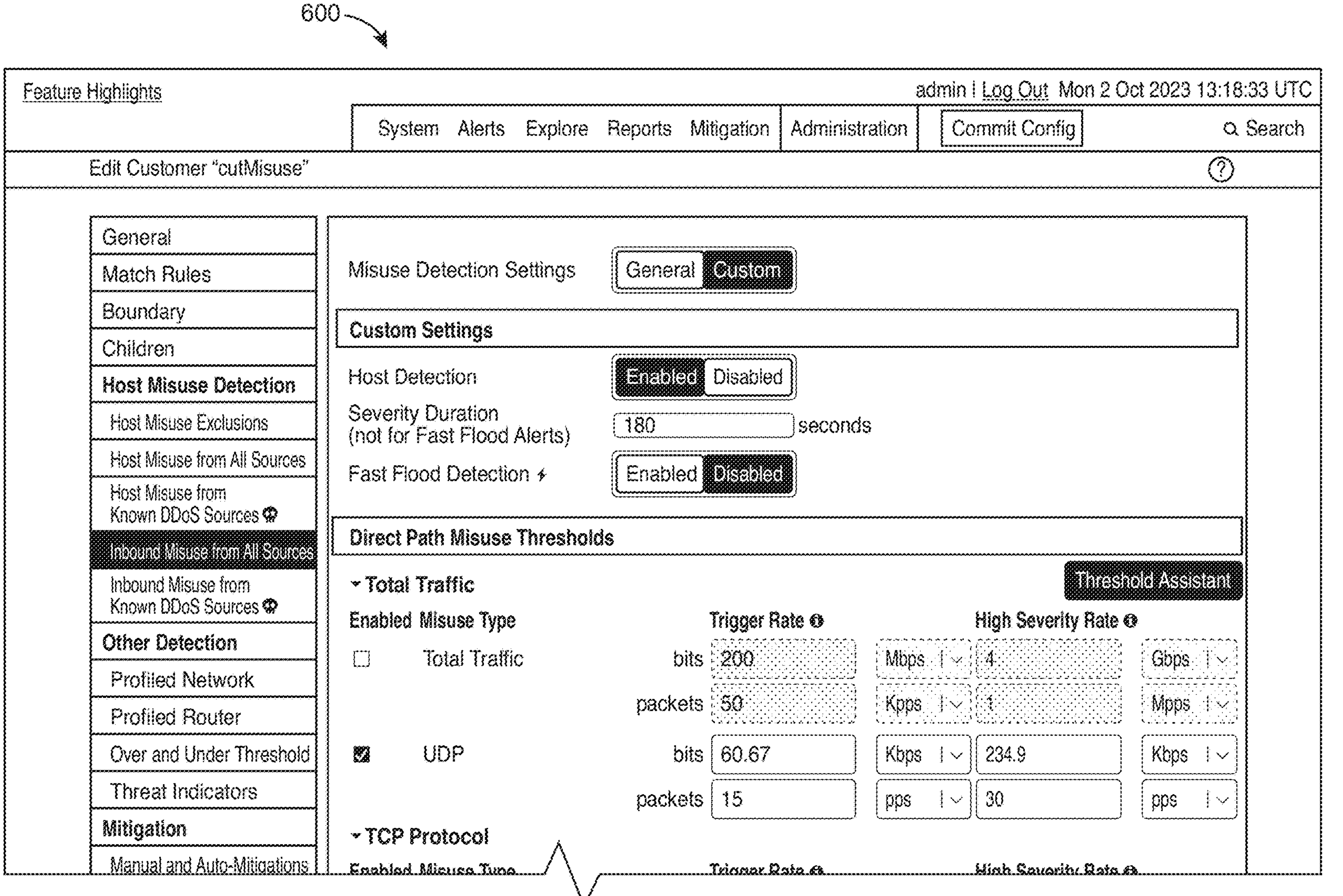
Figure 6B:
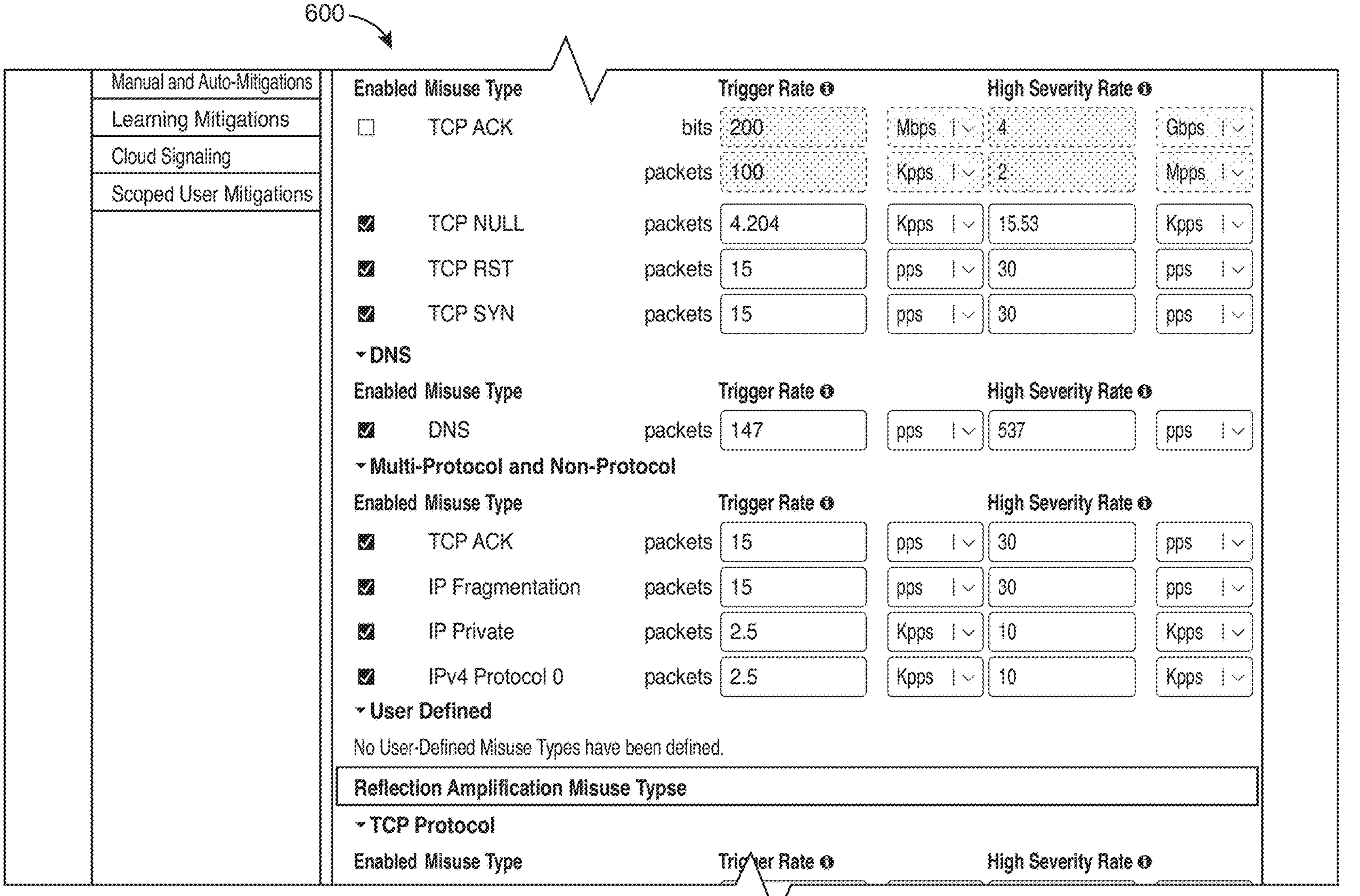
Figure 6C:
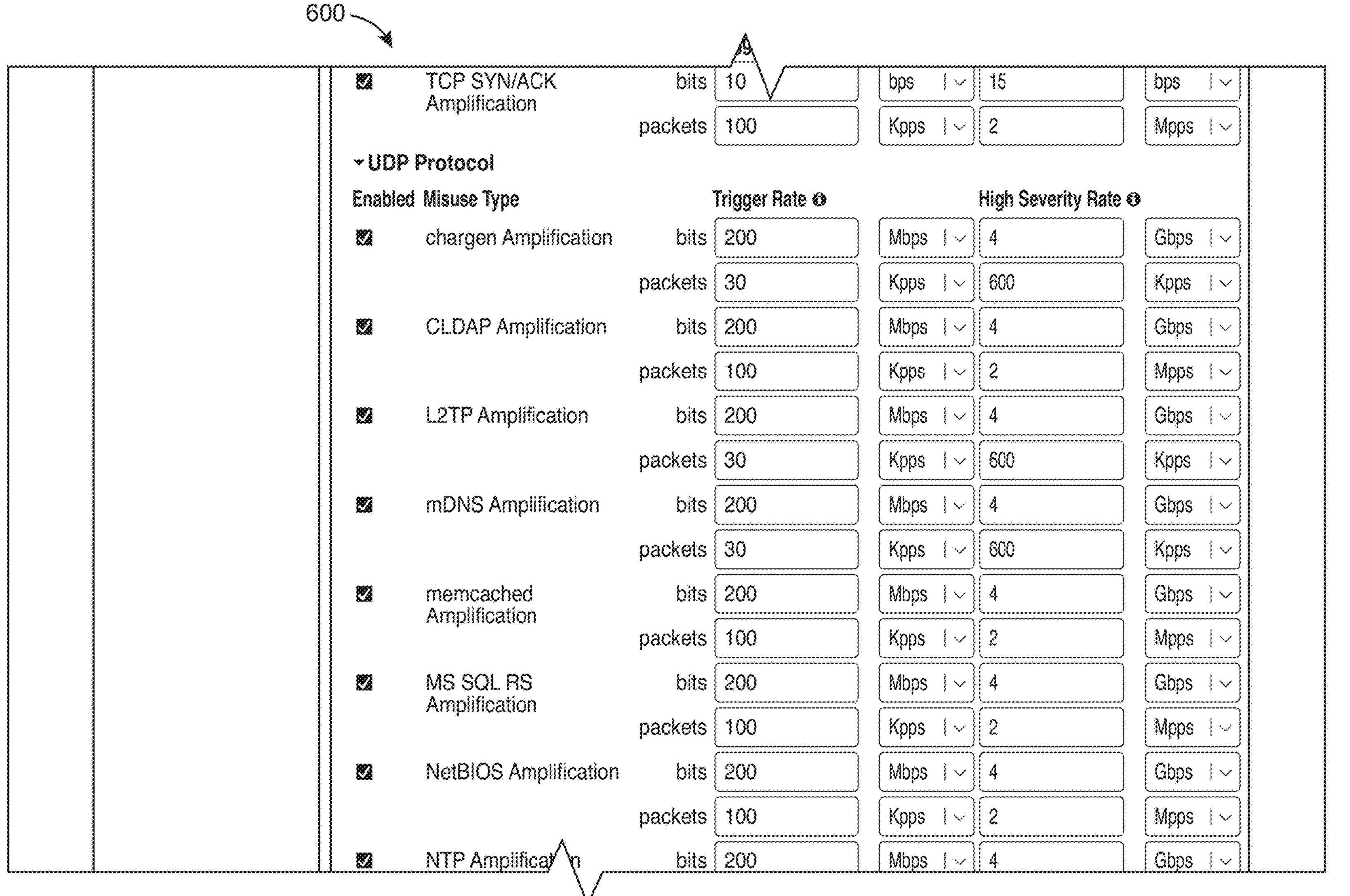
Figure 6D:
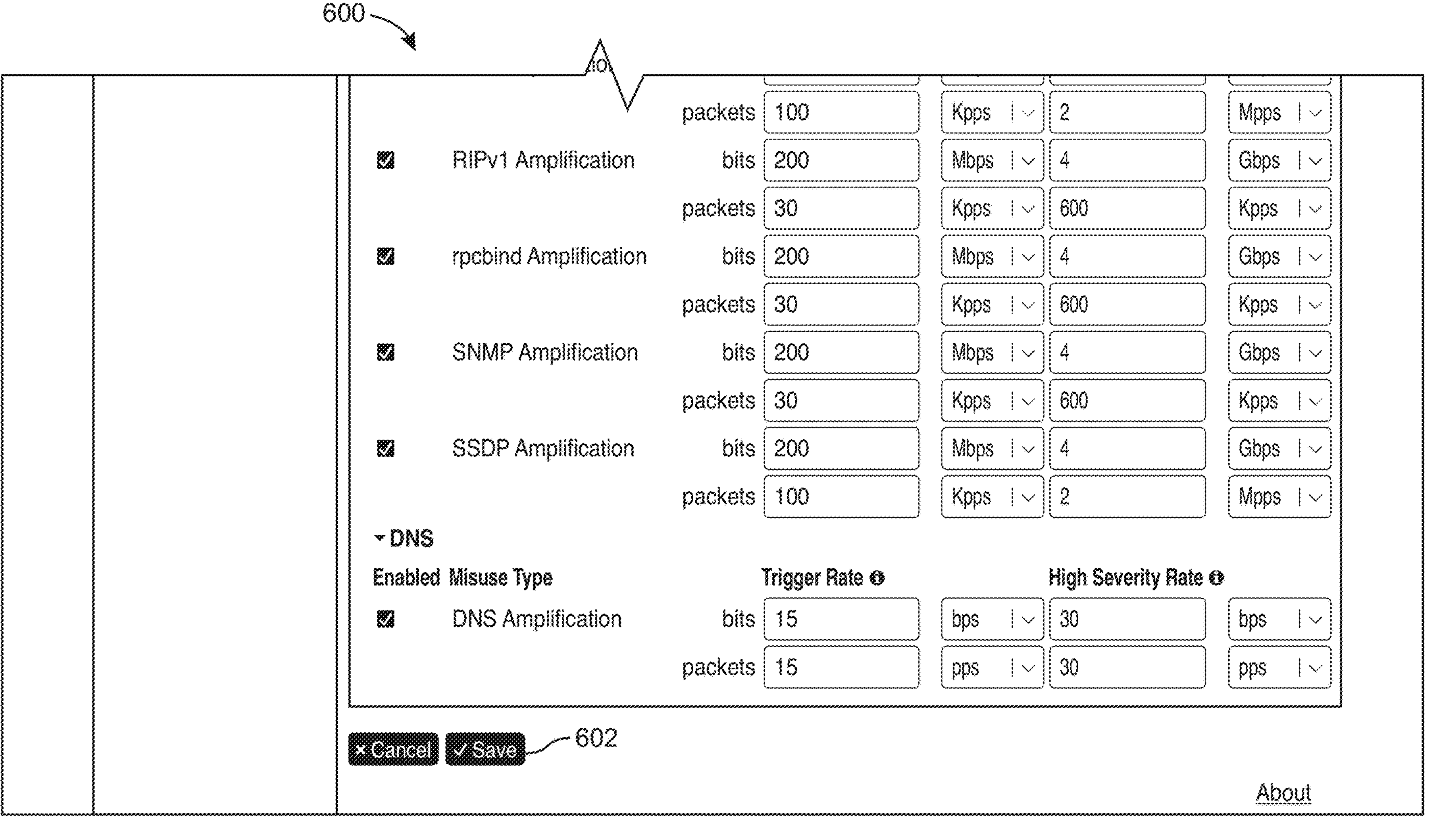
Figure 8A:
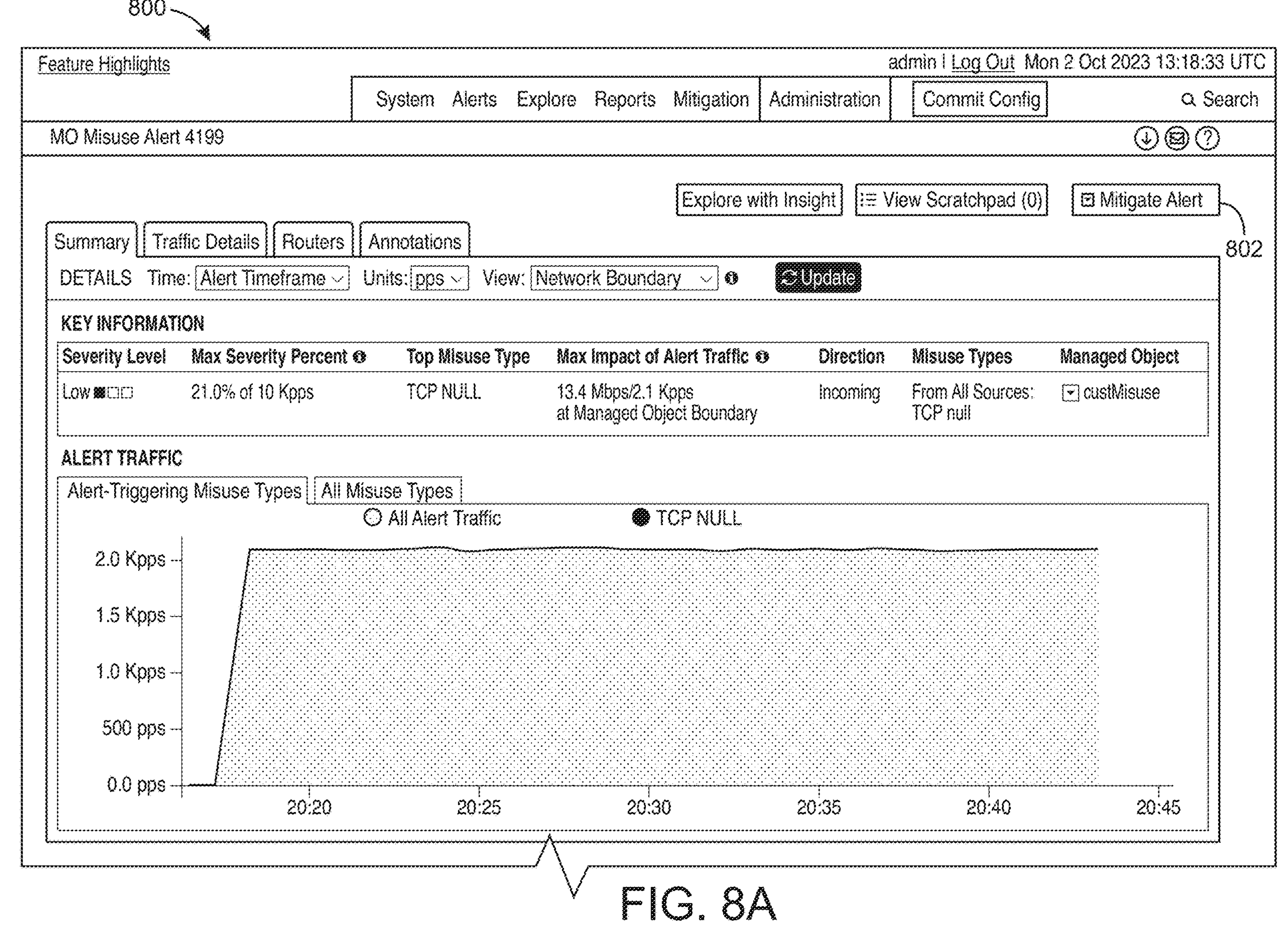
Figure 8B:
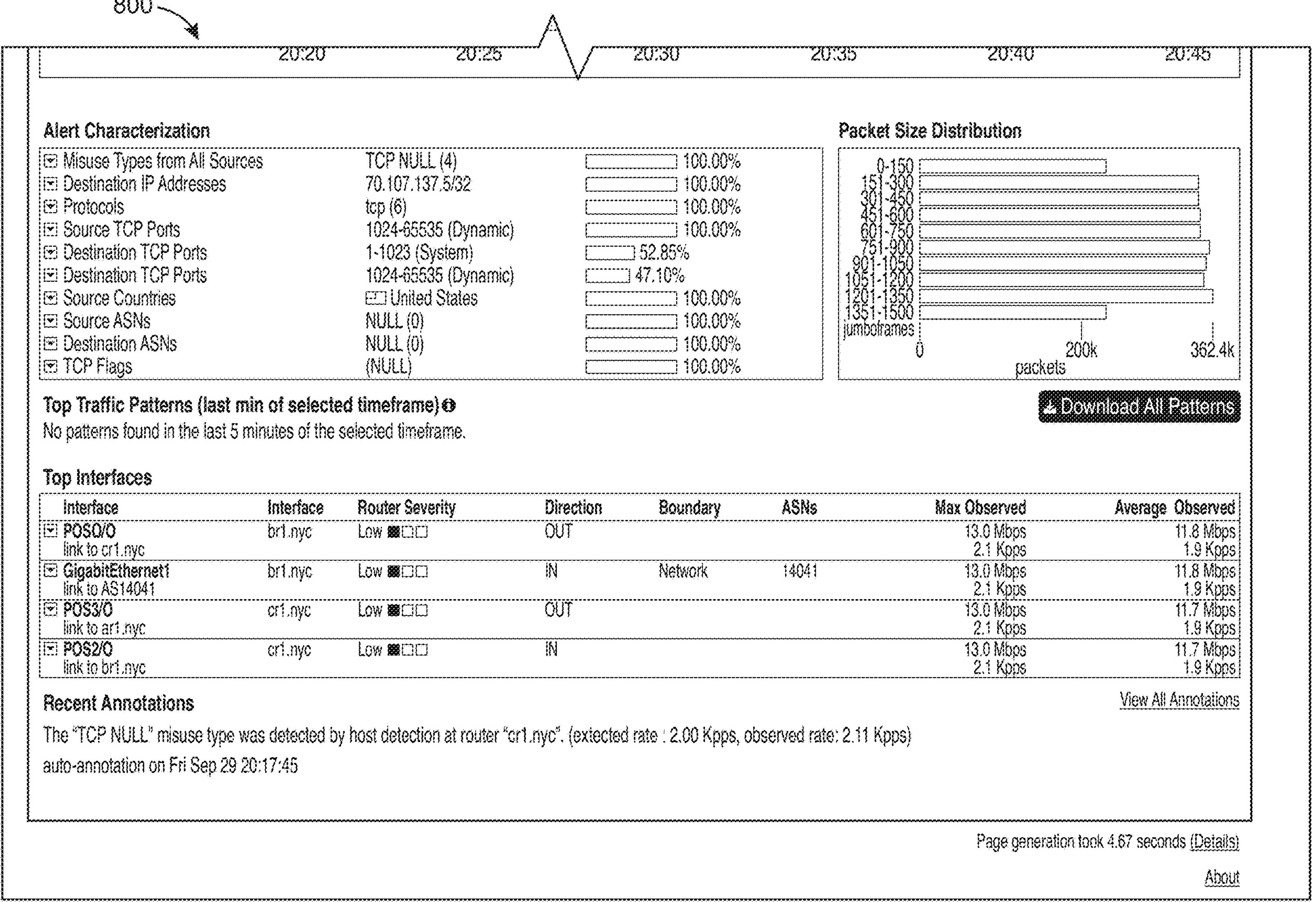
Figure 9:
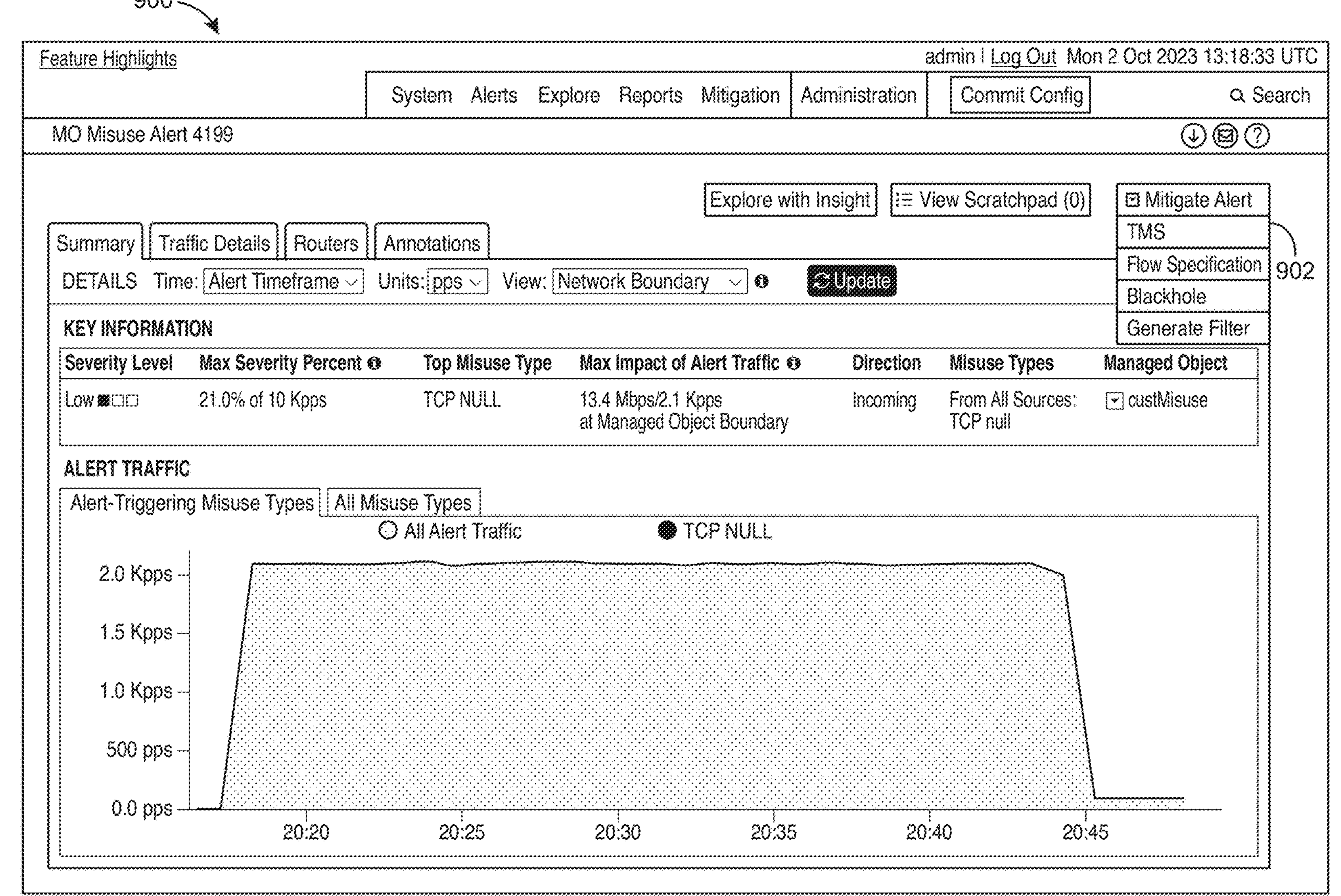
Figure 10:
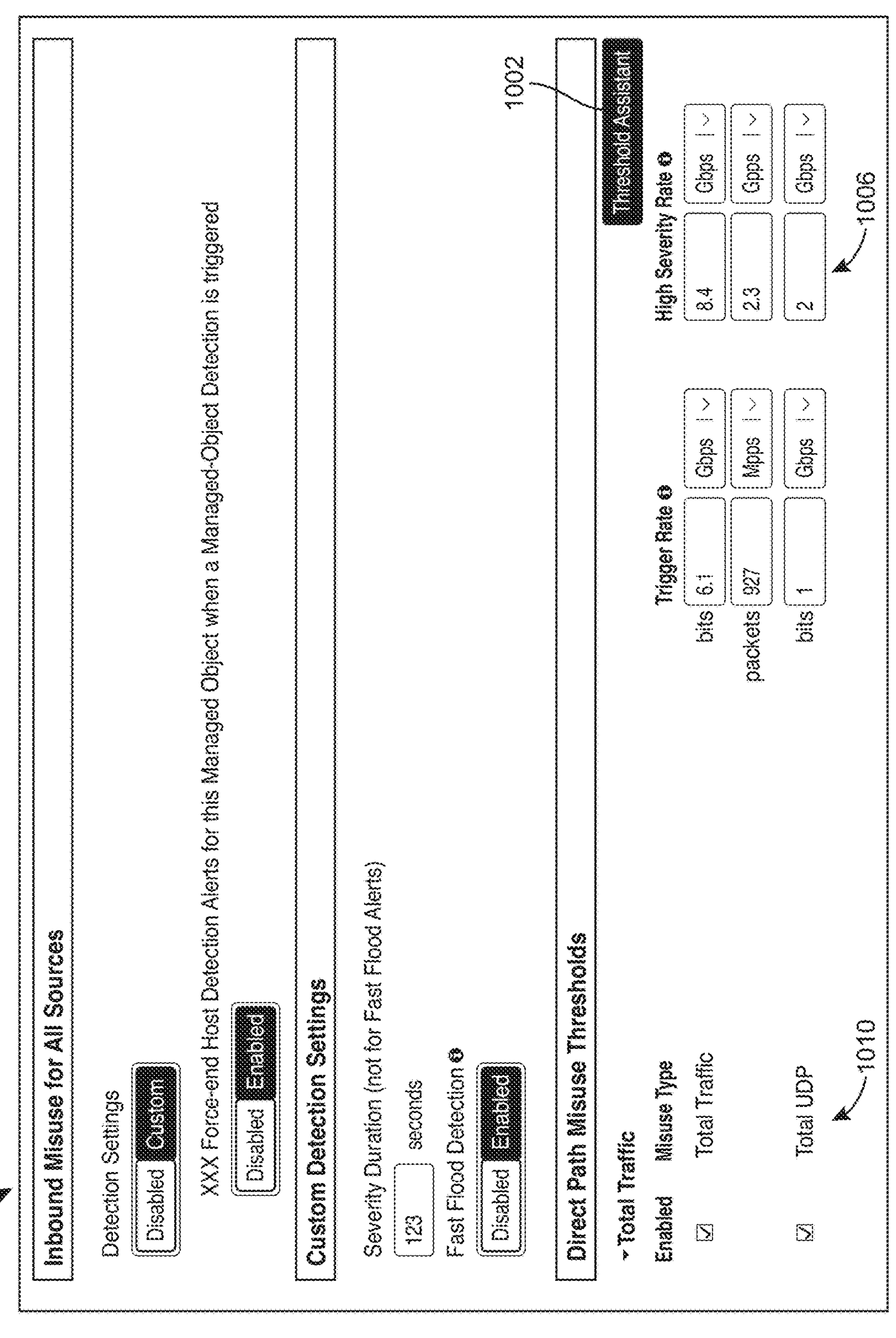

FIG. 2 is an example method for DDOS anomaly detection, in accordance with an implementation. The method 200 can be performed by a data processing system (a client device, a probe, the monitoring device 102, shown and described with reference to FIG. 1, a server system, etc.). The method 200 may include more or fewer operations and the operations may be performed in any order. Performance of the method 200 may enable the data processing system to assist a user in determining thresholds to use for anomaly detection of a communications network.

At operation 202, the data processing system collects network data packets. The network data packets may be transmitted across a communications network. The data processing system can collect the network data packets from the communications network. The data processing system can collect the network data packets for a first time period. The first time period can be a defined time prior to the current time up until the current time. At operation 204, the data processing system presents a user interface. The data processing system can present the user interface at a client device, such as by transmitting the user interface to the client device. The client device can display the user interface to a user. The user interface can include one or more fields configured to receive values of thresholds for different misuse types for different managed objects (e.g., computing devices communicating or taking part in communication across the communications network). The thresholds can be used for anomaly detection for the respective misuse types and/or managed objects.

At operation 206, the data processing system determines if a threshold assistant button was selected. For example, the data processing system can include a threshold assistance button on the user interface. The threshold assistance button can correspond to individual fields, individual managed objects, all of the fields, all of the managed objects, or any subset of the fields and/or managed objects. For example, the user can select the fields for which to generate thresholds upon selection of the threshold assistance button. For any fields for which the data processing system does not receive a selection of the threshold assistance button, the data processing system can receive input values into the fields at operation 208. For any fields for which the data processing system receives the selection of the threshold assistance button, at operation 210, the data processing system determines the thresholds for the fields, such as based on or by applying a function to data of the collected data packets from the first time period that correspond to the respective fields. The data processing system can determine the thresholds for the fields by performing the calculations described herein for the fields responsive to determining the threshold assistance button was selected or by retrieving previously determined thresholds for the fields responsive to determining the threshold assistance button was selected. At operation 212, the data processing system populates the fields with the respective received, retrieved, or determined values for the thresholds.

At operation 214, the data processing system collects network data packets for a second time period. At operation 216, the data processing system determines values for network characteristics from the collected network data packets. The network characteristics can be bits-per-second or packets-per-second for the different misuse types and/or managed objects that correspond to the respective fields. At operation 218, the data processing system determines whether the values exceed the thresholds of the fields corresponding to the same misuse types and/or managed objects. At operation 220, the data processing system detects anomalies in any misuse types and/or managed objects that correspond to values exceeding the thresholds for the respective network characteristics.

At operation 222, the data processing system generates a record (e.g., a file, document, table, listing, message, notification, etc.) identifying the misuse types and/or managed objects for which the data processing system detected the anomalies. At operation 224, the data processing system reorganizes the communications network. The data processing system can reorganize the communications network based on the detected anomalies or the data in the generated record. The data processing system can reorganize the communications network itself or by transmitting a message including the record to a remote computing device (e.g., a computing device of a network provider) that manages the network. The remote computing device or the network provider can reorganize the communications network according to the data in the record. Thus, the data processing system can use the systems and methods described herein to mitigate network attacks and/or improve network operation.

FIGS. 3-10 are example user interfaces 300-1000 illustrating data regarding DDOS attacks, in accordance with an implementation. The user interfaces 300-1000 can be user interfaces generated by a data processing system (e.g., the user interface generator 116 or the monitoring device 102, shown and described with reference to FIG. 1). Through the user interfaces 300-1000, the data processing system can provide a platform that a user can use to configure an application or system for anomaly detection.

The user interface 300 illustrates a list of fields configured to receive inputs for thresholds for managed object DDOS detection. The user interface 300 illustrates a "spreadsheet view" in which users can input values for thresholds into the different fields that the data processing system can then use for anomaly detection. The user interface 300 can include two tabs on the side referring to different detection types. The different detection types can be "Host detection for all sources" and "Host detection for known DDOS sources." The user interface 300 can also include a misuse type column 304 that indicates the misuse type of a threshold, a trigger rate column 306 that includes fields for trigger rate thresholds, a higher severity rate column 308 that includes fields to receive values for high severity thresholds (e.g., higher risk anomalies than anomalies detected using the trigger rate thresholds), and a network characteristic column 310 that includes drop down menus with options to indicate the network characteristics (e.g., packets-per-second or bits-per-second) of the thresholds in the fields of the columns 306 and/or 308. The user interface can also include an enabled column 312 that include selectable options that can be selected to indicate which thresholds and misuse types to monitor of a managed object. The user interface can correspond to misuse types of a single managed object that the data processing system is monitoring. The data processing system may generate similar user interfaces for any number of managed objects. The user interface 300 can also include a selectable threshold assistant button 302. A user can select the threshold assistant button 302 to view the user interface 400, which can enable the user to select an option to receive suggestions for different thresholds for anomaly detection. In some cases, selection of the threshold assistant button 302 can cause the data processing system to generate thresholds as described herein and populate (e.g., automatically populate) the fields in the columns 306 and/or 308 with the corresponding thresholds or values of thresholds. The user viewing the user interface 1000 can change or update the values in the forms.

The user interface 400 illustrates an example of the threshold assistant. The data processing system may display the user interface 400 in response to the user's selection of the threshold assistant button 302 on the user interface 300. The user interface 400 illustrates different misuse types 404 are selected (e.g., based on the misuse types that correspond to selected boxes) for the data processing system to determine or otherwise predict thresholds. The user interface 400 can include trigger rate thresholds 406 indicating the currently applied thresholds for the different misuse types 404 and suggested thresholds (e.g., thresholds determined using systems and methods described herein) for the different misuse types to use to detect anomalies. The user interface 400 can include high severity rate thresholds 408 indicating the currently applied thresholds for the different misuse types and suggested thresholds (e.g., thresholds determined using systems ad methods described herein) for the different misuse types to use to detect high severity anomalies. The user interface 400 can also include selectable buttons 410 that correspond to different levels of anomaly detection of smaller rate, moderate, and larger rate. The levels can correspond to different thresholds such that the smaller rate corresponds to a higher threshold than the moderate rate which corresponds to a higher threshold than the larger rate. A level of the selectable buttons 410 can be selected and the data processing system can update the suggested thresholds in the trigger rate thresholds 406 and the high severity rate thresholds 408 according to the selected level. The user interface 400 can also include an apply selected button 402. A user can select the apply selected button 402 to view the user interface 500, which can be an updated version of the user interface 400 with suggested thresholds for the selected misuse types.

The user interface 500 can be the same as or similar to the user interface 400. In the user interface 500, the suggested values from the user interface 400 have been copied over to the applied values and the gray dotted lines in the graphs have changed. Copying the suggested values into the applied values can alter the max y-value presented in graphs 504 and 506 of the user interface 500 illustrating network traffic of a misuse type (e.g., a DNS misuse type) for the trigger rate threshold and the high severity rate threshold, respectively, allowing all the content to be scaled to fit across the canvas. For example, the DNS values are shown to be 147 packet-per-second and 542 packet-per-second in the user interface 500. The user interface 500 can include an apply and close button 502. The user can select the apply and close button to cause the suggested thresholds to auto-populate the corresponding fields of the user interface 300.

The user interface 600 shows an updated view of the user interface 300. The user interface 600 has been updated with the values shown on the user interface 500. For instance, in the user interface 600 the values for the DNS misuse type can change from 10 and 30 to 147 and 537, respectively. The user viewing the user interface 600 can change the values in any of the fields. The user can select a save button 602 to store the values as thresholds to be used for anomaly detection.

The user interface 700 shows an example view of an anomaly (e.g., a DOS or DDOS alert listing). The data processing system may generate entries 702-710 on the user interface 700 in response to determining values of the network characteristics of the fields exceed respective thresholds saved from the user interface 600.

The user interface 800 shows an example of an anomaly alert details page. The data processing system may present the user interface 800 in response to a selection of one of the entries presented on the user interface 700. The user interface 800 can include details regarding the selected alert. The user interface 800 can also include a mitigate alert button 802. A user can select the mitigate alert button 802 to cause the data processing system to automatically mitigate the anomaly associated with the user interface 800 or cause a drop down menu to appear depicting different methods of mitigating the anomaly. A user can select a method of mitigating the anomaly from the drop down menu and the data processing system can mitigate the anomaly according to the selection.

In one example, the user interface 900 shows an example of an anomaly alert details page with a mitigation option. In the user interface 900, a user can select an option 902 from a dropdown menu of mitigation options. The selected option can indicate how to mitigate the anomaly of the alert. The options may be, for example, methods for testing (MTS) flow specification, blackhole, and/or generate filter. The data processing system can receive the selection and implement the selected mitigation technique, either by adjusting the network itself or by transmitting a message indicating the mitigation technique to a network operator.

The user interface 1000 illustrates another example user interface for implementing the threshold assistant. The user interface 1000 can include a threshold assistant button 1002. When a user selects the threshold assistant button 1002, the data processing system can cause a pair of traffic graphs to appear on the user interface 1000 or otherwise update the user interface 1000 to show the traffic graphs in a different user interface. In some cases, selection of the threshold assistant button 1002 can cause the data processing system to generate thresholds as described herein and populate forms in fields 1006 with the corresponding thresholds or values of thresholds. The user viewing the user interface 1000 can change or update the values in the forms. In some embodiments, the data processing system can use the values in the fields 1006 to generate the traffic graphic graphs. The data processing system can present the user interface 400 or 500 on the user interface 1000 (e.g., as a pop-up over the user interface 1000) (e.g., subsequent to generating the values in the fields 1006 and/or responsive to a selection of another button to cause the traffic graphs to appear). The pair of traffic graphs can be the same as the graphs 504 and 506 shown and described with reference to FIG. 5. The pair of traffic graphs can depict observed traffic datasets. The observed traffic datasets can be used at the time of detection evaluation to determine whether an alert should be triggered, escalated to a higher severity, or ended. The user can see the amount of traffic observed during a recently elapsed time-frame (e.g., the previous seven days) from the pair of traffic graphs 1004 to gain context of what has happened recently. The traffic graphs can include various lines drawn on the graph to represent the values which are also shown in the table below. The fields 1006 can represent applied values (e.g., the number which is currently in the form for that misuse type and rate) from the traffic graphs or otherwise the values or thresholds from which the data processing system generated the traffic graphs. The user viewing the user interface 1000 can choose to view different misuse types 1010 and can also choose the misuse types for which they want to accept the suggested values. When the user clicks "Apply" or "Apply and Close," those numbers are copied into the forms on the user interface 1000. The user can change the rate suggestion sensitivity to choose smaller rates, moderate rates, or larger rates. These different sensitivities can influence the probability that the system will detect more or fewer anomalies. After closing the assistant, the user can manually make fine-tuning adjustments to the values in the form.

At least one aspect of this technical solution is directed to a method for detecting and mitigating network attacks. The method may include collecting, by one or more processors, network data packets transmitted by a plurality of computing devices across a communications network; presenting, by the one or more processors, a user interface on a user device, the user interface comprising a threshold calculation button and one or more fields each corresponding to a threshold for a different network characteristic of the communications network; receiving, by the one or more processors, a selection of the threshold calculation button from the user device; determining, by the one or more processors, a threshold for each of the one or more fields based on the collected network data packets; and responsive to receiving the selection of the threshold calculation button, automatically populating, by the one or more processors, each of the one or more fields with the threshold determined for the field, each threshold corresponding to a minimum value for detecting an attack on the communications network for the network characteristic corresponding to the field populated with the threshold; and detecting, by the one or more processors, an attack on the communications network using a first threshold that was automatically populated into a first field of the one or more fields.

At least one aspect of this technical solution is directed to a system. The system can include one or more processors, coupled to memory. The one or more processors can present a user interface on a user device, the user interface comprising a threshold calculation button and one or more fields each corresponding to a threshold for a different network characteristic of the communications network; receive, a selection of the threshold calculation button from the user device; determine a threshold for each of the one or more fields based on the collected network data packets; and responsive to receiving the selection of the threshold calculation button, automatically populate each of the one or more fields with the threshold determined for the field, each threshold corresponding to a minimum value for detecting an attack on the communications network for the network characteristic corresponding to the field populated with the threshold; and detect an attack on the communications network using a first threshold that was automatically populated into a first field of the one or more fields.

At least one aspect of this technical solution is directed to non-transitory computer-readable media. The non-transitory computer-readable media may comprise instructions that, when executed by one or more processors, cause the one or more processors to: present a user interface on a user device, the user interface comprising a threshold calculation button and one or more fields each corresponding to a threshold for a different network characteristic of the communications network; receive, a selection of the threshold calculation button from the user device; determine a threshold for each of the one or more fields based on the collected network data packets; and responsive to receiving the selection of the threshold calculation button, automatically populate each of the one or more fields with the threshold determined for the field, each threshold corresponding to a minimum value for detecting an attack on the communications network for the network characteristic corresponding to the field populated with the threshold; and detect an attack on the communications network using a first threshold that was automatically populated into a first field of the one or more fields.

B. Computing Environment

Figure 11A:
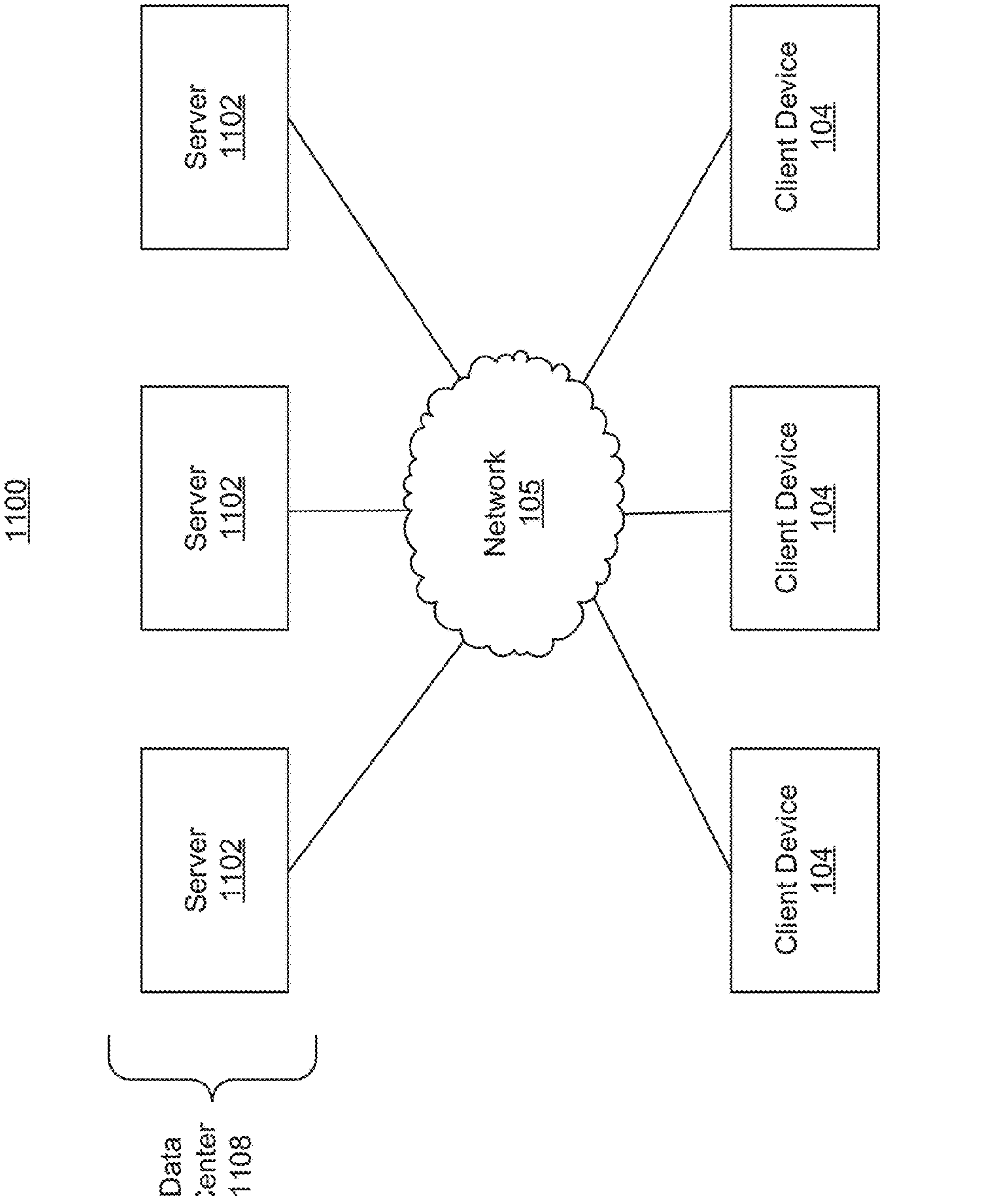
FIG. 11A is a block diagram depicting an implementation of a network environment including a client device in communication with a server device.

FIG. 11A depicts an example network environment that can be used in connection with the methods and systems described herein. In brief overview, the network environment 1100 includes one or more client devices 104 (also generally referred to as clients, client node, client machines, client computers, client computing devices, endpoints, or endpoint nodes) in communication with one or more servers 1102 (also generally referred to as servers, nodes, or remote machine) via one or more networks 105. In some embodiments, a client 104 has the capacity to function as both a client node seeking access to resources provided by a server and as a server providing access to hosted resources for other client devices 104.

Although FIG. 11A shows a network 105 between the client devices 104 and the servers 1102, the client devices 104 and the servers 1102 can be on the same network 105. In embodiments, there are multiple networks 105 between the client devices 104 and the servers 1102. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 1100 can include multiple, logically grouped servers 1102. The logical group of servers can be referred to as a data center 1108 (or server farm or machine farm). In embodiments, the servers 1102 can be geographically dispersed. The data center 1108 can be administered as a single entity or different entities. The data center 1108 can include multiple data centers 1108 that can be geographically dispersed. The servers 1102 within each data center 1108 can be homogeneous or heterogeneous (e.g., one or more of the servers 1102 or machines 1102 can operate according to one type of operating system platform (e.g., WINDOWS NT, manufactured by Microsoft Corp. of Redmond, Washington), while one or more of the other servers 1102 can operate on according to another type of operating system platform (e.g., Unix, Linux, or Mac OS X)). The servers 1102 of each data center 1108 do not need to be physically proximate to another server 1102 in the same machine farm 1108. Thus, the group of servers 1102 logically grouped as a data center 1108 can be interconnected using a network. Management of the data center 1108 can be de-centralized. For example, one or more servers 1102 can comprise components, subsystems and modules to support one or more management services for the data center 1108.

Server 1102 can be a file server, application server, web server, proxy server, appliance, network appliance, gateway, gateway server, virtualization server, deployment server, SSL VPN server, or firewall. In embodiments, the server 1102 can be referred to as a remote machine or a node. Multiple nodes can be in the path between any two communicating servers.

Figure 11B:
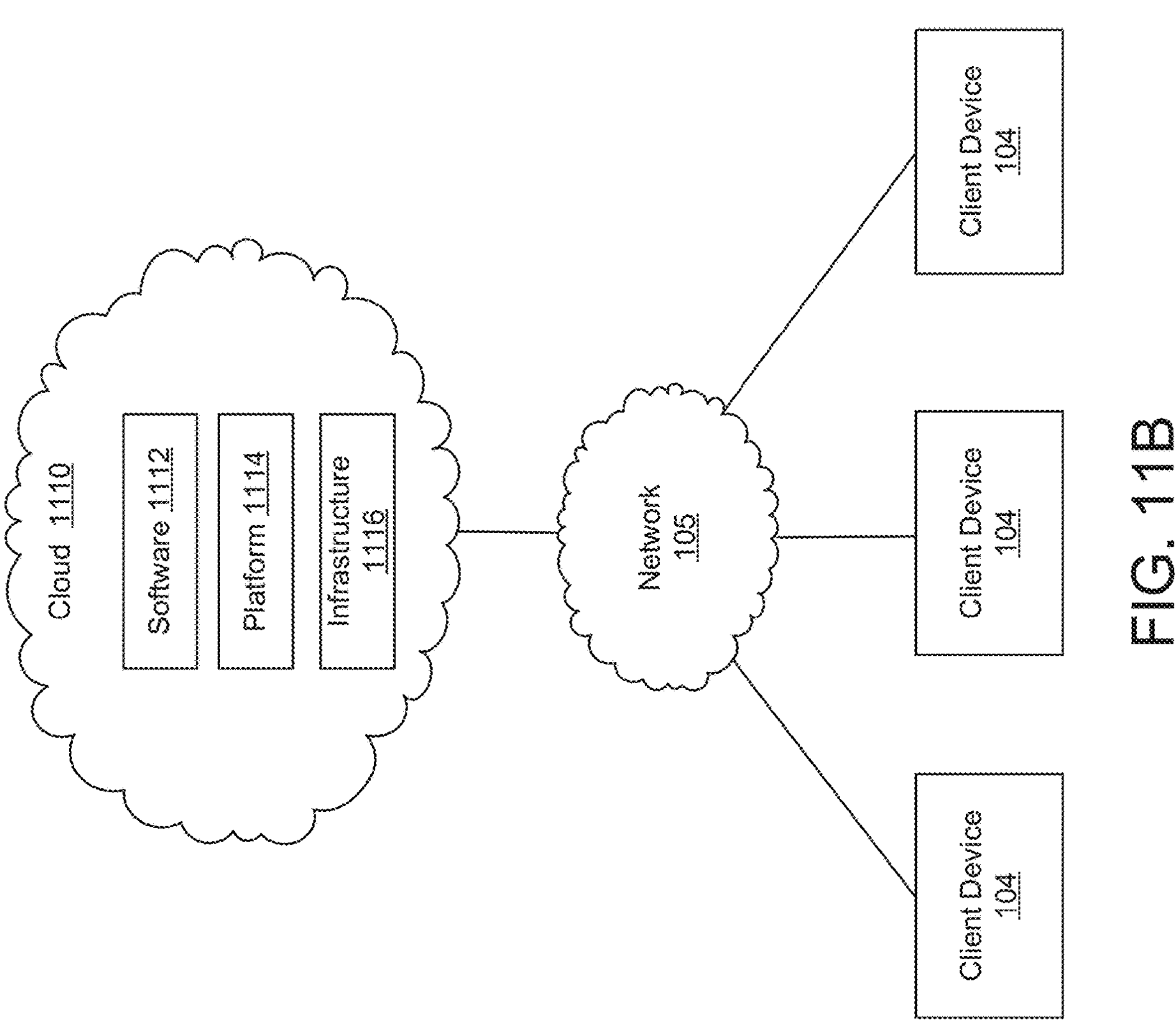
FIG. 11B is a block diagram depicting a cloud computing environment including a client device in communication with cloud service providers.

FIG. 11B illustrates an example cloud computing environment. A cloud computing environment 1101 can provide client 104 with one or more resources provided by a network environment. The cloud computing environment 1101 can include one or more client devices 104, in communication with the cloud 1110 over one or more networks 105. Client devices 104 can include, e.g., thick clients, thin clients, and zero clients. A thick client can provide at least some functionality even when disconnected from the cloud 1110 or servers 1102. A thin client or a zero client can depend on the connection to the cloud 1110 or server 1102 to provide functionality. A zero client can depend on the cloud 1110 or other networks 105 or servers 1102 to retrieve operating system data for the client device. The cloud 1110 can include back end platforms, e.g., servers 1102, storage, server farms or data centers.

The cloud 1110 can be public, private, or hybrid. Public clouds can include public servers 1102 that are maintained by third parties to the client devices 104 or the owners of the clients. The servers 1102 can be located off-site in remote geographical locations as disclosed above or otherwise. Public clouds can be connected to the servers 1102 over a public network. Private clouds can include private servers 1102 that are physically maintained by client devices 104 or owners of clients. Private clouds can be connected to the servers 1102 over a private network 105. Hybrid clouds 1108 can include both the private and public networks 105 and servers 1102.

The cloud 1110 can also include a cloud-based delivery, e.g., Software as a Service (Saas) 1112, Platform as a Service (PaaS) 1114, and the Infrastructure as a Service (IaaS) 1116. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 104 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 104 and server 1102 can be deployed as and/or executed on any type and form of computing device, e.g., a computer, network device or appliance capable of communicating on any type and form of network and performing the operations described herein.

Figure 11C:
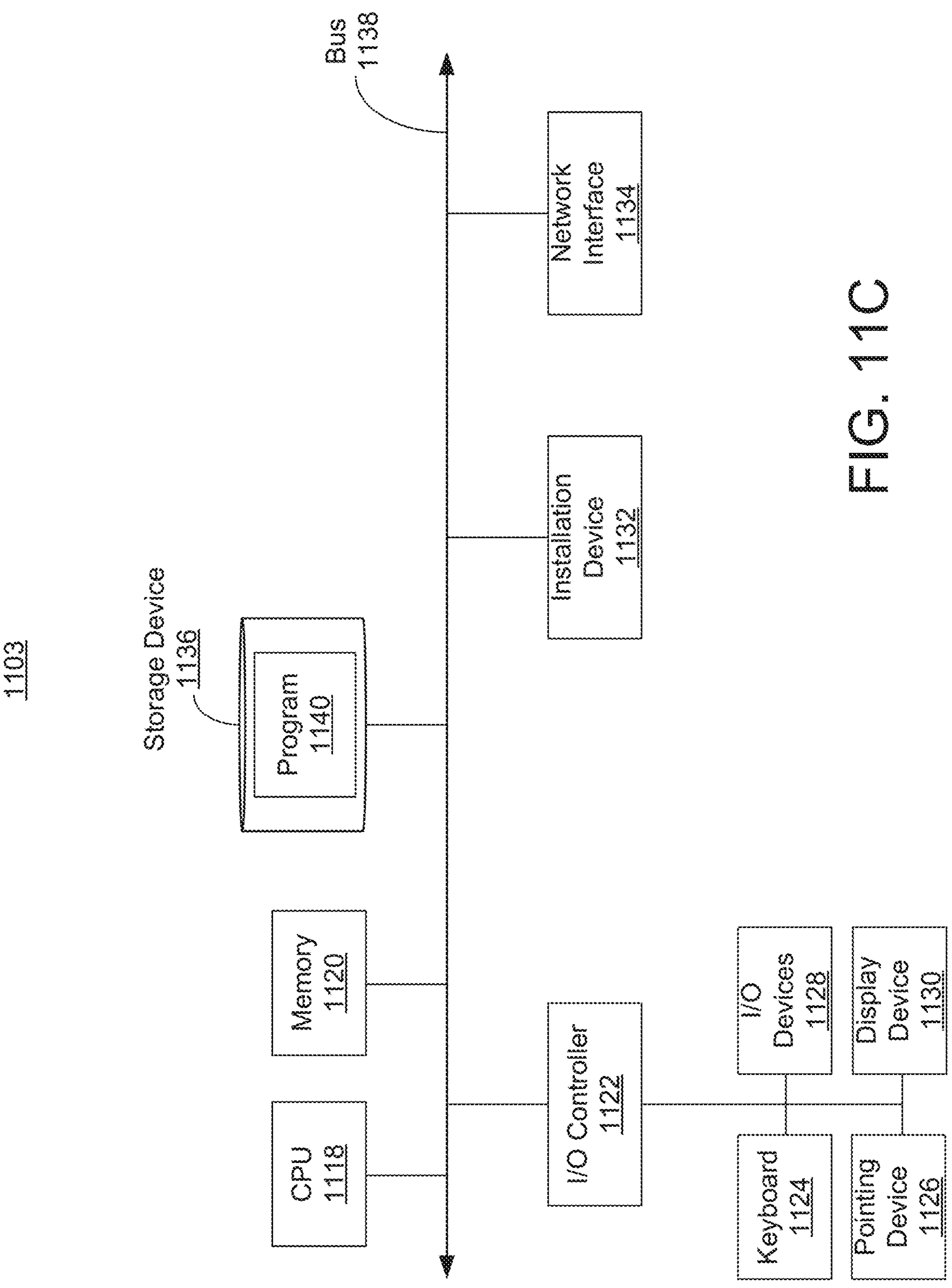
FIG. 11C is a block diagram depicting an implementation of a computing device that can be used in connection with the systems depicted in FIGS. 1, 11A, and 11B and the method depicted in FIG. 2.

FIG. 11C depicts block diagrams of a computing device 1103 useful for practicing an embodiment of the client 104 or a server 1102. As shown in FIG. 11C, each computing device 1103 can include a central processing unit 1118, and a main memory unit 1120. As shown in FIG. 11C, a computing device 1103 can include one or more of a storage device 1136, an installation device 1132, a network interface 1134, an I/O controller 1122, a display device 1130, a keyboard 1124 or a pointing device 1126, e.g., a mouse. The storage device 1136 can include, without limitation, a program 1140, such as an operating system, software, or software associated with system 100.

The central processing unit 1118 is any logic circuitry that responds to and processes instructions fetched from the main memory unit 1120. The central processing unit 1118 can be provided by a microprocessor unit, e.g.: those manufactured by Intel Corporation of Mountain View, California. The computing device 1103 can be based on any of these processors, or any other processor capable of operating as described herein. The central processing unit 1118 can utilize instruction level parallelism, thread level parallelism, different levels of cache, and multi-core processors. A multi-core processor can include two or more processing units on a single computing component.

Main memory unit 1120 can include one or more memory chips capable of storing data and allowing any storage location to be directly accessed by the microprocessor 1118. Main memory unit 1120 can be volatile and faster than storage 1136 memory. Main memory units 1120 can be Dynamic random access memory (DRAM) or any variants, including static random access memory (SRAM). The memory 1120 or the storage 1136 can be non-volatile; e.g., non-volatile read access memory (NVRAM). The memory 1120 can be based on any type of memory chip, or any other available memory chips. In the example depicted in FIG. 11C, the processor 1118 can communicate with memory 1120 via a system bus 1138.

A wide variety of I/O devices 1128 can be present in the computing device 1103. Input devices 1128 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 1128 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 1128, display devices 1130 or group of devices can be augmented reality devices. The I/O devices can be controlled by an I/O controller 1122 as shown in FIG. 11C. The I/O controller 1122 can control one or more I/O devices, such as, e.g., a keyboard 1124 and a pointing device 1126, e.g., a mouse or optical pen. Furthermore, an I/O device can also provide storage and/or an installation device 1132 for the computing device 1103. In embodiments, the computing device 1103 can provide USB connections (not shown) to receive handheld USB storage devices. In embodiments, an I/O device 1128 can be a bridge between the system bus 1138 and an external communication bus, e.g., a USB bus, a SCSI bus, a Fire Wire bus, an Ethernet bus, a Gigabit Ethernet bus, a Fibre Channel bus, or a Thunderbolt bus.

In embodiments, display devices 1130 can be connected to I/O controller 1122. Display devices can include, e.g., liquid crystal displays (LCD), electronic papers (e-ink) displays, flexile displays, light emitting diode displays (LED), or other types of displays. In some embodiments, display devices 1130 or the corresponding I/O controllers 1122 can be controlled through or have hardware support for OPENGL or DIRECTX API or other graphics libraries. Any of the I/O devices 1128 and/or the I/O controller 1122 can include any type and/or form of suitable hardware, software, or combination of hardware and software to support, enable or provide for the connection and use of one or more display devices 1130 by the computing device 1103. For example, the computing device 1103 can include any type and/or form of video adapter, video card, driver, and/or library to interface, communicate, connect or otherwise use the display devices 1130. In embodiments, a video adapter can include multiple connectors to interface to multiple display devices 1130.

The computing device 1103 can include a storage device 1136 (e.g., one or more hard disk drives or redundant arrays of independent disks) for storing an operating system or other related software, and for storing application software programs 1140 such as any program related to the systems, methods, components, modules, elements, or functions depicted in FIG. 1 or 2. Examples of storage device 1136 include, e.g., hard disk drive (HDD); optical drive including CD drive, DVD drive, or BLU-RAY drive; solid-state drive (SSD); USB flash drive; or any other device suitable for storing data. Storage devices 1136 can include multiple volatile and non-volatile memories, including, e.g., solid state hybrid drives that combine hard disks with solid state cache. Storage devices 1136 can be non-volatile, mutable, or read-only. Storage devices 1136 can be internal and connect to the computing device 1103 via a bus 1138. Storage device 1136 can be external and connect to the computing device 1103 via an I/O device 1130 that provides an external bus. Storage device 1136 can connect to the computing device 1103 via the network interface 1134 over a network 105. Some client devices 104 may not require a non-volatile storage device 1136 and can be thin clients or zero client devices 104. Some storage devices 1136 can be used as an installation device 1132 and can be suitable for installing software and programs.

The computing device 1103 can include a network interface 1134 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 1103 can communicate with other computing devices 1103 via any type and/or form of gateway or tunneling protocol, e.g., Secure Socket Layer (SSL) or Transport Layer Security (TLS), QUIC protocol, or the Citrix Gateway Protocol manufactured by Citrix Systems, Inc. of Ft. Lauderdale, Florida. The network interface 1134 can include a built-in network adapter, network interface card, PCMCIA network card, EXPRESSCARD network card, card bus network adapter, wireless network adapter, USB network adapter, modem or any other device suitable for interfacing the computing device 1103 to any type of network capable of communication and performing the operations described herein.

A computing device 1103 of the sort depicted in FIG. 11C can operate under the control of an operating system, which controls scheduling of tasks and access to system resources. The computing device 1103 can be running any operating system configured for any type of computing device, including, for example, a desktop operating system, a mobile device operating system, a tablet operating system, or a smartphone operating system.

The computing device 1103 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 1103 has sufficient processor power and memory capacity to perform the operations described herein. In some embodiments, the computing device 1103 can have different processors, operating systems, and input devices consistent with the device.

In embodiments, the status of one or more machines 104, 1102 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 1103 in response to the CPU 1118 executing an arrangement of instructions contained in main memory 1120. Such instructions can be read into main memory 1120 from another computer-readable medium, such as the storage device 1136. Execution of the arrangement of instructions contained in main memory 1120 causes the computing device 1103 to perform the illustrative processes described herein. One or more processors in a multi-processing arrangement may also be employed to execute the instructions contained in main memory 1120. Hard-wired circuitry can be used in place of or in combination with software instructions together with the systems and methods described herein. Systems and methods described herein are not limited to any specific combination of hardware circuitry and software.

Although an example computing system has been described in FIG. 11, the subject matter including the operations described in this specification can be implemented in other types of digital electronic circuitry, or in computer software, firmware, or hardware, including the structures disclosed in this specification and their structural equivalents, or in combinations of one or more of them.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the monitoring device 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for detecting and mitigating network attacks:

collecting, by one or more processors, network data packets transmitted by a plurality of computing devices across a communications network;

presenting, by the one or more processors, a user interface on a user device, the user interface comprising a threshold calculation button and one or more fields each corresponding to a threshold for a different network characteristic of the communications network;

receiving, by the one or more processors, a selection of the threshold calculation button from the user device;

responsive to receiving the selection of the threshold calculation button:

determining, by the one or more processors, a threshold for each of the one or more fields based on the collected network data packets; and automatically populating, by the one or more processors, each of the one or more fields with the threshold determined for the field, each threshold corresponding to a minimum value for detecting an attack on the communications network for the network characteristic corresponding to the field populated with the threshold; and detecting, by the one or more processors, an attack on the communications network using a first threshold that was automatically populated into a first field of the one or more fields.

2. The method of claim 1, wherein collecting the network data packets comprises collecting, by the one or more processors, first network data packets during a first time period, the method further comprising:

collecting, by the one or more processors, second network data packets from the plurality of computing devices during a second time period subsequent to the first time period and automatically populating each of the one or more fields with the threshold determined for the field;

determining, by the one or more processors, a value for a network characteristic of the second network data packets exceeds a threshold populated into a field on the user interface for the network characteristic; and responsive to determining the value for the network characteristic exceeds the threshold, detecting, by the one or more processors, an anomaly in the communications network for the network characteristic.

3. The method of claim 2, further comprising:

responsive to detecting the anomaly in the communications network, reorganizing, by the one or more processors, the communications network according to the anomaly.

4. The method of claim 3, further comprising:

receiving, by the one or more processors, a selection of a network mitigation button from the user interface, the network mitigation button displayed on the user interface in response to detecting the anomaly in the communications network, wherein reorganizing the communications network comprises reorganizing, by the one or more processors, the communication network in response to receiving the selection of the network mitigation button.

5. The method of claim 4, further comprising:

presenting, by the one or more processors, the network mitigation button in a plurality of network mitigation buttons on the user interface, each of the plurality of network mitigation buttons corresponding to a different type of network mitigation, wherein reorganizing the communications network comprises reorganizing, by the one or more processors, the communication network based on a type of network mitigation of the network mitigation button.

6. The method of claim 3, wherein reorganizing the communications network comprises:

responsive to detecting the anomaly in the communications network, transmitting, by the one or more processors, a record indicating the anomaly to a communications network provider associated with the communications network, wherein the communications network provider reorganizes the communications network according to the anomaly.

7. The method of claim 3, wherein the anomaly corresponds to one of the plurality of computing devices transmitting a number of data packets or a number of bits across the communications network exceeding the threshold, and wherein reorganizing the communications network comprises adjusting a capability of the computing device to communicate across the communications network.

8. The method of claim 3, wherein reorganizing the communications network comprises automatically reorganizing, by the one or more processors, the communications network in response to detecting the anomaly in the communications network.

9. The method of claim 2, further comprising:

generating, by the one or more processors, a record comprising an alert responsive to detecting the anomaly in the communications network; and transmitting, by the one or more processors, the record comprising the alert to a remote computing device.

10. The method of claim 1, wherein determining the threshold for each of the one or more fields comprises:

assigning, by the one or more processors, the collected network data packets into a plurality of bins each corresponding to a different time window of a time period;

for each bin, determining, by the one or more processors, a bin value for each network characteristic corresponding to the one or more fields of the user interface; and determining, by the one or more processors, the threshold for each respective field of the one or more fields as a function of the bin values for the network characteristic of the respective field.

11. The method of claim 10, wherein determining the threshold for each of the one or more fields comprises:

determining, by the one or more processors for each of the one or more fields, the threshold based on a value of a defined percentile of the bin values for the field.

12. The method of claim 11, further comprising:

multiplying, by the one or more processors, the value of the defined percentile of the bin values for the field by a plurality of defined values to determine a plurality of thresholds, the plurality of threshold including the threshold and each corresponding to a different anomaly detection level; and presenting, by the one or more processors on the user interface, a plurality of selectable buttons each corresponding to a different one of the plurality of thresholds.

13. The method of claim 12, wherein automatically populating the field with the threshold comprises populating, by the one or more processors, the field with the threshold responsive to receiving a selection of a selectable button of the plurality of selectable buttons that corresponds to the threshold.

14. The method of claim 12, wherein at least one field of the one or more fields corresponds to a number of data packets or a number of bits transmitted by a computing device of the plurality of computing devices across the communications network.

15. The method of claim 11, wherein determining the threshold comprises:

multiplying, by the one or more processors, the value of the defined percentile of the bin values for the field by a defined value.

16. A system, comprising:

one or more processors, coupled to memory, to:

collect network data packets transmitted by a plurality of computing devices across a communications network;

present a user interface on a user device, the user interface comprising a threshold calculation button and one or more fields each corresponding to a threshold for a different network characteristic of the communications network;

receive a selection of the threshold calculation button from the user device;

responsive to receiving the selection of the threshold calculation button:

determine a threshold for each of the one or more fields based on the collected network data packets; and automatically populate each of the one or more fields with the threshold determined for the field, each threshold corresponding to a minimum value for detecting an attack on the communications network for the network characteristic corresponding to the field populated with the threshold; and detect an attack on the communications network using a first threshold that was automatically populated into a first field of the one or more fields.

17. The system of claim 16, wherein the one or more processors are to collect the network data packets by collecting first network data packets during a first time period, and wherein the one or more processors are further to:

collect second network data packets from the plurality of computing devices during a second time period subsequent to the first time period and automatically populating each of the one or more fields with the threshold determined for the field;

determine a value for a network characteristic of the second network data packets exceeds a threshold populated into a field on the user interface for the network characteristic; and responsive to determining the value for the network characteristic exceeds the threshold, detect an anomaly in the communications network for the network characteristic.

18. The system of claim 17, wherein the one or more processors are further to:

generate a record comprising an alert responsive to detecting the anomaly in the communications network; and transmit the record comprising the alert to a remote computing device.

19. A non-transitory computer readable storage medium comprising instructions stored thereon that, when executed by one or more processors, cause the one or more processors to:

collect network data packets transmitted by a plurality of computing devices across a communications network;

present a user interface on a user device, the user interface comprising a threshold calculation button and one or more fields each corresponding to a threshold for a different network characteristic of the communications network;

receive a selection of the threshold calculation button from the user device;

responsive to receiving the selection of the threshold calculation button:

determine a threshold for each of the one or more fields based on the collected network data packets; and automatically populate each of the one or more fields with the threshold determined for the field, each threshold corresponding to a minimum value for detecting an attack on the communications network for the network characteristic corresponding to the field populated with the threshold; and detect an attack on the communications network using a first threshold that was automatically populated into a first field of the one or more fields.

20. The non-transitory computer readable storage medium of claim 19, wherein execution of the instructions cause the one or more processors to collect the network data packets by collecting first network data packets during a first time period, and wherein execution of the instructions further cause the one or more processors to:

collect second network data packets from the plurality of computing devices during a second time period subsequent to the first time period and automatically populating each of the one or more fields with the threshold determined for the field;

determine a value for a network characteristic of the second network data packets exceeds a threshold populated into a field on the user interface for the network characteristic; and responsive to determining the value for the network characteristic exceeds the threshold, detect an anomaly in the communications network for the network characteristic.

* * * * *